(12) United States Patent
Yoshikawa et al.

(10) Patent No.: US 10,790,767 B2
(45) Date of Patent: Sep. 29, 2020

(54) CONTROL DEVICE OF PERMANENT MAGNET SYNCHRONOUS MOTOR AND IMAGE FORMING DEVICE

(71) Applicant: KONICA MINOLTA, INC., Chiyoda-ku, Tokyo (JP)

(72) Inventors: Hiroyuki Yoshikawa, Toyohashi (JP); Daichi Suzuki, Toyokawa (JP); Yuta Tachibana, Toyokawa (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 16/401,416

(22) Filed: May 2, 2019

(65) Prior Publication Data

US 2019/0372490 A1 Dec. 5, 2019

(30) Foreign Application Priority Data

Jun. 5, 2018 (JP) .................................. 2018-107885

(51) Int. Cl.
| | | |
|---|---|---|
| H02P 25/08 | (2016.01) | |
| H02P 6/185 | (2016.01) | |
| H02K 11/22 | (2016.01) | |
| H02P 25/089 | (2016.01) | |
| H02K 1/27 | (2006.01) | |

(52) U.S. Cl.
CPC ........... *H02P 6/185* (2013.01); *H02K 1/2773* (2013.01); *H02K 11/22* (2016.01); *H02P 25/089* (2016.02)

(58) Field of Classification Search
CPC ...... H02K 11/22; H02K 1/2773; H02P 21/24; H02P 21/32; H02P 25/089; H02P 6/185
See application file for complete search history.

(56) References Cited

U.S. PATENT DOCUMENTS

2006/0022623 A1\* 2/2006 Inaba ...................... H02P 6/185
318/400.02

FOREIGN PATENT DOCUMENTS

| JP | S6369489 U | 3/1988 |
|---|---|---|
| JP | 2016082615 A | 5/2016 |

\* cited by examiner

*Primary Examiner* — Muhammad S Islam
(74) *Attorney, Agent, or Firm* — Buchanan Ingersoll & Rooney PC

(57) ABSTRACT

A control device of a permanent magnet synchronous motor that is a control device of a sensorless-type permanent magnet synchronous motor in which a rotor using a permanent magnet rotates by a rotating magnetic field caused by a current flowing in an armature includes: a driver that applies a voltage to the armature and drives the rotor; an initial position estimator that estimates an initial position which is a magnetic pole position of the rotor that is stopped; and a controller that controls the driver so as to apply a pulse train including a voltage pulse for searching the initial position for each of n angle positions dividing a search range of an electrical angle of 360 degrees to the armature, wherein the pulse train includes a first pulse and a second pulse.

12 Claims, 20 Drawing Sheets

| APPLICATION ORDER | ANGLE θ (ELECTRICAL ANGLE) | MEASURE CURRENT (●: MEASURE) |
|---|---|---|
| (1) | 0° | ● |
| (2) | 180° | ● |
| (3) | 30° | ● |
| (4) | 210° | ● |
| (5) | 60° | ● |
| (6) | 240° | ● |
| (7) | 90° | ● |
| (8) | 270° | ● |
| (9) | 120° | ● |
| (10) | 300° | ● |
| (11) | 150° | ● |
| (12) | 330° | ● |

| APPLICATION ORDER | | ANGLE θ (ELECTRICAL ANGLE) | MEASURE CURRENT (●: MEASURE) |
|---|---|---|---|
| Pg1 | (1) | 0° ($\theta 1$) | ● |
|  | (2) | 180° ($\theta 2$) | ● |
|  | (3) | 210° ($\theta 3$) | ● |
|  | (4) | 30° ($\theta 4$) | ● |
| Pg2 | (5) | 60° ($\theta 1$) | ● |
|  | (6) | 240° ($\theta 2$) | ● |
|  | (7) | 270° ($\theta 3$) | ● |
|  | (8) | 90° ($\theta 4$) | ● |
| Pg3 | (9) | 120° ($\theta 1$) | ● |
|  | (10) | 300° ($\theta 2$) | ● |
|  | (11) | 330° ($\theta 3$) | ● |
|  | (12) | 150° ($\theta 4$) | ● |

FIG. 15

| | APPLICATION ORDER | ANGLE θ (ELECTRICAL ANGLE) | MEASURE CURRENT (●: MEASURE) |
|---|---|---|---|
| Pg1 | (1) | 0°(θ1) | ● |
| | (2) | 180°(θ2) | --- |
| | (3) | 180°(θ3) | --- |
| | (4) | 0°(θ4) | --- |
| Pg2 | (5) | 30°(θ1) | ● |
| | (6) | 210°(θ2) | --- |
| | (7) | 210°(θ3) | --- |
| | (8) | 30°(θ4) | --- |
| Pg3 | (9) | 60°(θ1) | ● |
| | (10) | 240°(θ2) | --- |
| | (11) | 240°(θ3) | --- |
| | (12) | 60°(θ4) | --- |
| Pg4 | (13) | 90°(θ1) | ● |
| | (14) | 270°(θ2) | --- |
| | (15) | 270°(θ3) | --- |
| | (16) | 90°(θ4) | --- |
| Pg5 | (17) | 120°(θ1) | ● |
| | (18) | 300°(θ2) | --- |
| | (19) | 300°(θ3) | --- |
| | (20) | 120°(θ4) | --- |
| Pg6 | (21) | 150°(θ1) | ● |
| | (22) | 330°(θ2) | --- |
| | (23) | 330°(θ3) | --- |
| | (24) | 150°(θ4) | --- |
| Pg7 | (25) | 180°(θ1) | ● |
| | (26) | 0°(θ2) | --- |
| | (27) | 0°(θ3) | --- |
| | (28) | 180°(θ4) | --- |
| Pg8 | (29) | 210°(θ1) | ● |
| | (30) | 30°(θ2) | --- |
| | (31) | 30°(θ3) | --- |
| | (32) | 210°(θ4) | --- |
| Pg9 | (33) | 240°(θ1) | ● |
| | (34) | 60°(θ2) | --- |
| | (35) | 60°(θ3) | --- |
| | (36) | 240°(θ4) | --- |
| Pg10 | (37) | 270°(θ1) | ● |
| | (38) | 90°(θ2) | --- |
| | (39) | 90°(θ3) | --- |
| | (40) | 270°(θ4) | --- |
| Pg11 | (41) | 300°(θ1) | ● |
| | (42) | 120°(θ2) | --- |
| | (43) | 120°(θ3) | --- |
| | (44) | 300°(θ4) | --- |
| Pg12 | (45) | 330°(θ1) | ● |
| | (46) | 150°(θ2) | --- |
| | (47) | 150°(θ3) | --- |
| | (48) | 330°(θ4) | --- |

| | APPLICATION ORDER | ANGLE θ (ELECTRICAL ANGLE) | MEASURE CURRENT (●: MEASURE) |
|---|---|---|---|
| Pg1 | (1) | 0° (θ1) | ● |
| | (2) | 180° (θ2) | --- |
| | (3) | 180° (θ3) | --- |
| | (4) | 30° (θ4) | ● |
| Pg2 | (5) | 60° (θ1) | ● |
| | (6) | 240° (θ2) | --- |
| | (7) | 240° (θ3) | --- |
| | (8) | 90° (θ4) | ● |
| Pg3 | (9) | 120° (θ1) | ● |
| | (10) | 300° (θ2) | --- |
| | (11) | 300° (θ3) | --- |
| | (12) | 150° (θ4) | ● |
| Pg4 | (13) | 180° (θ1) | ● |
| | (14) | 0° (θ2) | --- |
| | (15) | 0° (θ3) | --- |
| | (16) | 210° (θ4) | ● |
| Pg5 | (17) | 240° (θ1) | ● |
| | (18) | 60° (θ2) | --- |
| | (19) | 60° (θ3) | --- |
| | (20) | 270° (θ4) | ● |
| Pg6 | (21) | 300° (θ1) | ● |
| | (22) | 120° (θ2) | --- |
| | (23) | 120° (θ3) | --- |
| | (24) | 330° (θ4) | --- |

| | APPLICATION ORDER | ANGLE θ (ELECTRICAL ANGLE) | MEASURE CURRENT (●: MEASURE) |
|---|---|---|---|
| Pg1 | (1) | 0° (θ1) | ● |
| | (2) | 180° (θ2) | --- |
| | (3) | 180° (θ3) | ● |
| | (4) | 30° (θ4) | ● |
| Pg2 | (5) | 60° (θ1) | ● |
| | (6) | 240° (θ2) | --- |
| | (7) | 240° (θ3) | ● |
| | (8) | 90° (θ4) | ● |
| Pg3 | (9) | 120° (θ1) | ● |
| | (10) | 300° (θ2) | --- |
| | (11) | 300° (θ3) | ● |
| | (12) | 150° (θ4) | ● |
| Pg4 | (13) | 210° (θ1) | ● |
| | (14) | 60° (θ2) | --- |
| | (15) | 60° (θ3) | --- |
| | (16) | 270° (θ4) | ● |
| Pg5 | (17) | 330° (θ1) | ● |
| | (18) | 150° (θ2) | --- |
| | (19) | 150° (θ3) | --- |
| | (20) | 330° (θ4) | --- |

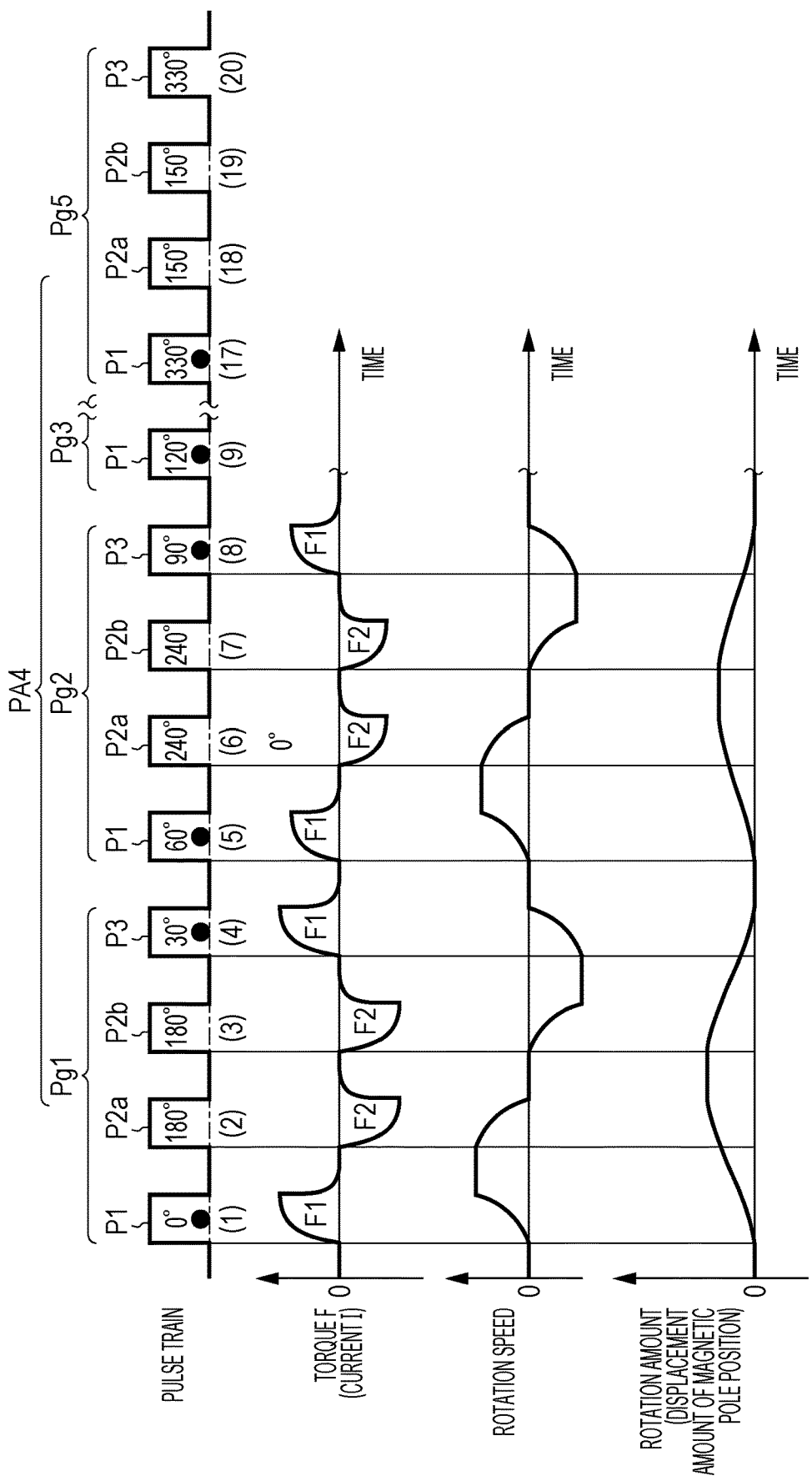

CONTROL DEVICE OF PERMANENT MAGNET SYNCHRONOUS MOTOR AND IMAGE FORMING DEVICE

The entire disclosure of Japanese patent Application No. 2018-107885, filed on Jun. 5, 2018, is incorporated herein by reference in its entirety.

BACKGROUND

Technological Field

The present invention relates to a control device of a permanent magnet synchronous motor and an image forming device.

Description of the Related Art

In general, a Permanent Magnet Synchronous Motor (PMSM) includes a stator including a winding (armature) and a rotor using a permanent magnet and flows an alternating current to the winding to generate a rotating magnetic field. As a result, the rotor rotates in synchronization with the rotating magnetic field.

In recent years, a sensorless-type permanent magnet synchronous motor is widely used. The sensorless-type does not include a magnetic sensor and an encoder for detecting a magnetic pole position. Therefore, to drive the sensorless-type permanent magnet synchronous motor, a method is used for estimating a magnetic pole position and a rotation speed of the rotor based on a current flowing by an induced voltage generated in the winding at the time of rotation.

In addition, there is a method referred to as an inductive sensing as a method for estimating the magnetic pole position of the rotor when the sensorless-type permanent magnet synchronous motor is stopped, that is, a method of initial position estimation. This method is a method using the property such that an inductance of the winding is slightly changed by the magnetic pole position. As indicated in JP 63-069489 A, the magnetic pole position is estimated by applying voltages to the windings so as to sequentially excite phases and comparing peak amplitude values of currents flowing in the windings at the time of excitation of the phases.

By performing the initial position estimation, when the rotor is rotated thereafter, the stator can be appropriately excited according to the magnetic pole position of the rotor.

As the related art for enhancing accuracy of the initial position estimation, there is a technique disclosed in JP 2016-82615 A. JP 2016-82615 A discloses that a time in which a voltage is applied for the initial position estimation is controlled to be a time that does not make a motor start.

In the initial position estimation by inductive sensing, the voltage is applied to the winding so as to generate a magnetic field for each of n angle positions dividing 360-degrees (2π) angle position range in an electrical angle into n sections. The voltage is applied a plurality of times at intervals, and a current flowing in the winding is measured for each application. Then, the magnetic pole position is estimated based on the results of the plurality of times of measurement. For example, an angle position having the largest current value is estimated as the magnetic pole position.

The voltage to be applied for the initial position estimation is set to be low within a range in which a valid difference according to the magnetic pole position occurs in the current values to be measured, and an application time is set to be short within a range in which the measurement can be performed.

However, depending on a positional relation between a direction of the magnetic field to be generated and the magnetic pole position at that time, there is a case where a rotation torque is generated by the magnetic field and the rotor slightly rotates. As a method for canceling the rotation, it is considered to differ an angle position of an odd-numbered application and an angle position of an even-numbered application by 180 degrees.

However, in particular, since an inner-rotor motor has a smaller inertia than an outer-rotor motor, there is a case where the rotor inertially continues to rotate after completion of the odd-numbered application. Therefore, the even-numbered application is performed at the time of the rotation, and an action of the magnetic field generated by the even-numbered application of which the angle position is 180 degrees different from the odd-numbered application is only a braking action for stopping the inertial rotation and does not reversely rotate the rotor. That is, the rotor stops in a state where the magnetic pole position has been changed (slightly moved) by the rotation caused by the odd-numbered application.

There has been a problem in that the displacement of the magnetic pole position deteriorates accuracy of the initial position estimation. When a displacement amount is accumulated and increased each time when the angle position is changed in the initial position estimation and the magnetic field is generated, the accuracy of the initial position estimation is further deteriorated.

SUMMARY

The present invention has been made in view of the above problems, and an object of the present invention is to reduce a displacement of a magnetic pole position at the time of initial position estimation and enhance accuracy of the initial position estimation.

To achieve the abovementioned object, according to an aspect of the present invention, there is provided a control device of a permanent magnet synchronous motor that is a control device of a sensorless-type permanent magnet synchronous motor in which a rotor using a permanent magnet rotates by a rotating magnetic field caused by a current flowing in an armature, and the control device reflecting one aspect of the present invention comprises: a driver that applies a voltage to the armature and drives the rotor; an initial position estimator that estimates an initial position which is a magnetic pole position of the rotor that is stopped; and a controller that controls the driver so as to apply a pulse train including a voltage pulse for searching the initial position for each of n angle positions dividing a search range of an electrical angle of 360 degrees to the armature, wherein the pulse train includes a first pulse at one of the n angle positions and a second pulse that is a pulse, that generates a torque larger than the torque generated by the first pulse, at an angle position where a torque is generated for rotating the rotor in a second direction opposite to a first direction that is a rotation direction of the rotor in a case where a torque for rotating the rotor is generated by application of the first pulse.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 15 is a diagram of the second example of the improved search order;

FIG. 20 is a diagram illustrating a configuration and an action of a pulse train according to the fourth example in FIGS. 19A and 19B.

DETAILED DESCRIPTION OF EMBODIMENTS

Hereinafter, one or more embodiments of the present invention will be described with reference to the drawings. However, the scope of the invention is not limited to the disclosed embodiments.

Figure 1:
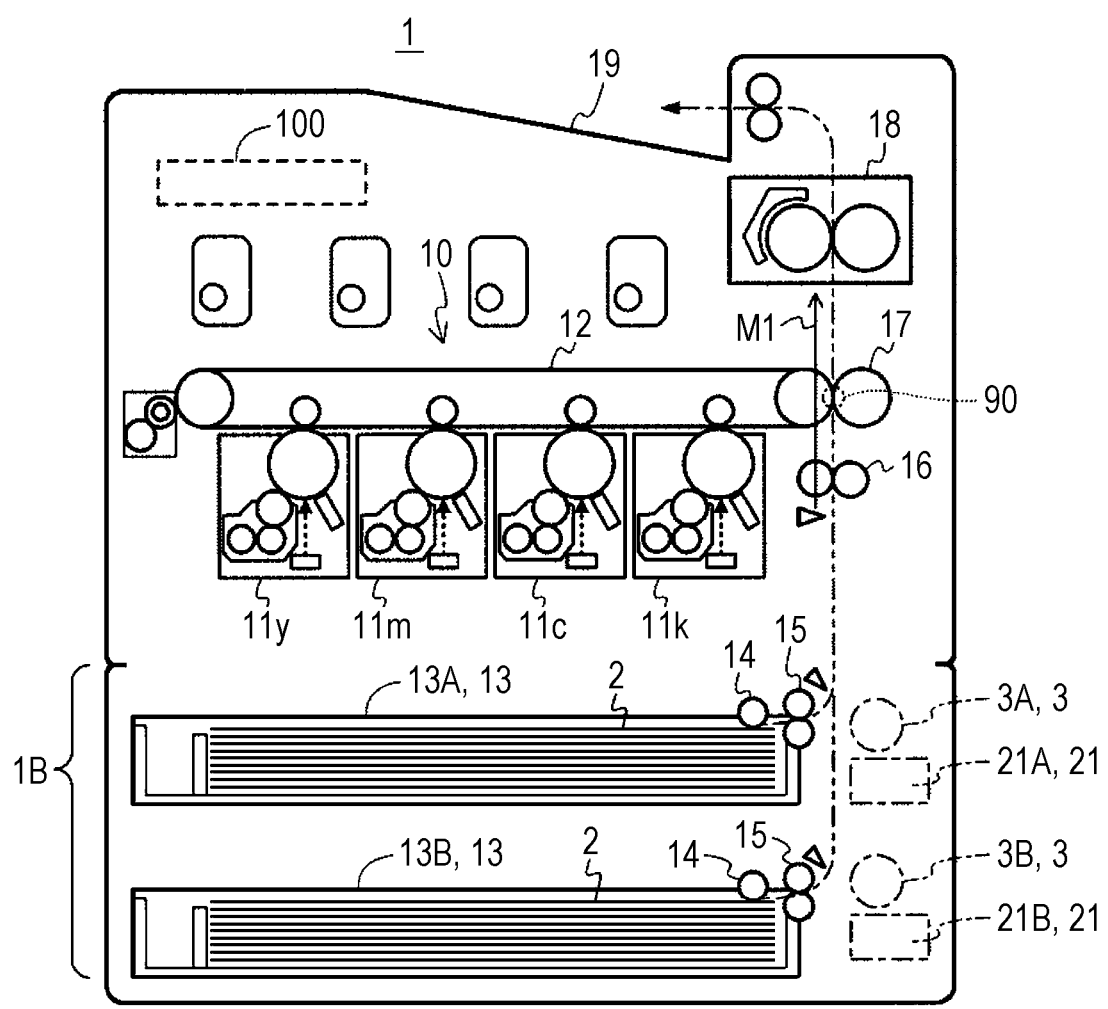
FIG. 1 is a diagram of an outline of a configuration of an image forming device including a motor control device according to one embodiment of the present invention.
Figure 2A:
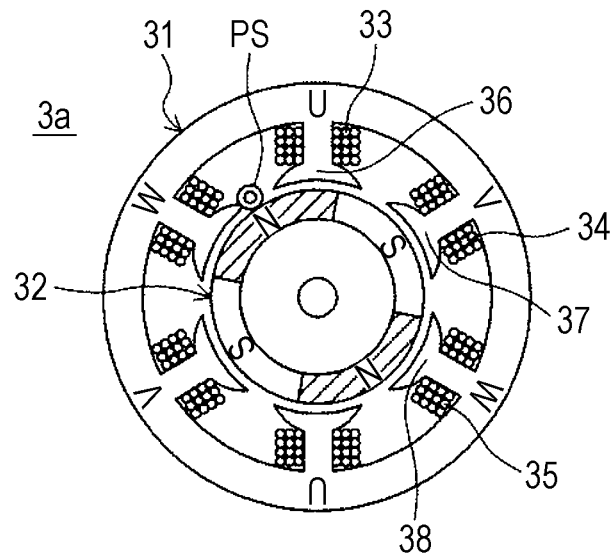
FIGS. 2A and 2B are schematic diagrams of a configuration of a brushless motor.
Figure 2B:
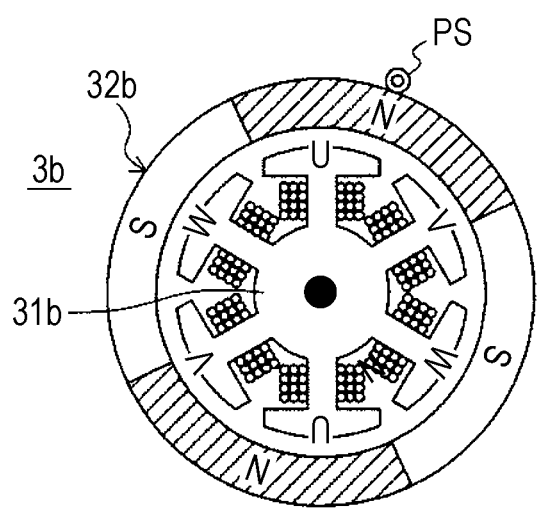

In FIG. 1, a schematic configuration of an image forming device including a control device according to an embodiment of the present invention is illustrated, and in FIGS. 2A and 2B, a configuration of a brushless motor 3 is schematically illustrated.

In FIG. 1, an image forming device 1 is an electrophotographic color printer including a tandem-type printer engine 10. A lower part 1B is a two-stage sheet cabinet including drawer type paper feed trays 13A and 13B.

The image forming device 1 forms a color or monochrome image according to a job input from an external host device via a network. The image forming device 1 includes a control circuit 100 that controls an operation of the image forming device 1. The control circuit 100 includes a processor that executes a control program and peripheral devices (ROM, RAM, and the like).

A printer engine 1A includes four imaging units 11y, 11m, 11c, and 111k, an intermediate transfer belt 12, and the like.

Basic configurations of the imaging units 11y to 11k are similar to each other, and each of the imaging units 11y to 11k includes a cylindrical photoreceptor, a charger, a developer, a cleaner, a light source for exposure, and the like. The intermediate transfer belt 12 is wound around a pair of rollers and rotates. On an inner side of the intermediate transfer belt 12, a primary transfer roller is arranged for each of the imaging units 11y to 11k.

In a color printing mode, the imaging units 11y to 11k form toner images of four colors including yellow (Y), magenta (M), cyan (C), and black (K) in parallel. The four-color toner images are primarily transferred on the rotating intermediate transfer belt 12 in sequence. The toner image of Y is transferred first, and the toner image of M, the toner image of C, and the toner image of K are subsequently transferred so as to overlap the toner image of Y.

In parallel to the formation of the toner images, a sheet (recording paper sheet) 2 is drawn from one of paper feed trays 13 selected according to job designation by a pickup roller 14 and is sent to resist rollers 16 by paper feed rollers 15.

The primarily-transferred toner image is secondarily transferred on the sheet 2 conveyed by the resist rollers 16 at a printing position 90 facing secondary transfer rollers 17. After the secondary transfer, the sheet 2 passes through an inside of a fixer 18 and is sent to a paper sheet discharge tray 19 in an upper part. When the sheet 2 passes through the fixer 18, the toner images are fixed on the sheet 2 by heating and pressurization.

The image forming device 1 includes a plurality of motors as driving sources for rotating rotators such as a photoreceptor, a developer, and various rollers. A motor 3A that is one of the motors rotates and drives a roller group of the upper paper feed tray 13A. Furthermore, a motor 3B that is another one of the motors rotates and drives a roller group of the lower paper feed tray 13A. The motors 3A and 3B are respectively controlled by motor control devices 21A and 21B. The motor control devices 21A and 21B respectively rotate and stop the motors 3A and 3B according to instructions from the control circuit 100.

Hereinafter, the motors 3A and 3B may be referred to as a "motor 3" without distinguishing the motors 3A and 3B from each other, and the motor control devices 21A and 21B may be referred to as a "motor control device 21" without distinguishing the motor control devices 21A and 21B from each other.

In FIGS. 2A and 2B, motors 3a and 3b are DC brushless motors, and more specifically, sensorless-type Permanent Magnet Synchronous Motors (PMSM).

The motor 3a illustrated in FIG. 2A includes a stator 31 as an armature for generating a rotating magnetic field and an inner-type rotor 32 using permanent magnets. The stator 31 includes a U-phase, V-phase, and W-phase cores 36, 37, and 38 arranged at intervals of an electrical angle of 120° and three windings (coils) 33, 34, and 35 connected in a Y shape. The rotating magnetic field is generated by flowing U-phase, V-phase, and W-phase three-phase alternating currents in the windings 33 to 35 to sequentially exciting the cores 36, 37, and 38. The rotor 32 rotates in synchronization with the rotating magnetic field.

The motor 3b illustrated in FIG. 2B includes a stator 31b for generating a rotating magnetic field and an outer-type rotor 32b using permanent magnets. The stator 31b includes a U-phase, V-phase, and W-phase cores 36b, 37b, and 38b arranged at intervals of an electrical angle of 120° and three windings (coils) 33b, 34b, and 35b connected in a Y shape. Similarly to the motor 3, the motor 3b rotates in synchronization with the rotating magnetic field.

In general, since an outer-rotor motor has a larger inertia of the rotor than an inner-rotor motor of the same class, the outer-rotor motor has excellent stability at the time of constant speed rotation. On the other hand, since the inner-rotor motor has a smaller inertia, the inner-rotor motor has excellent responsiveness.

In a multi-printing job using the plurality of sheets 2, the image forming device 1 needs to repeat activation and stop of the pickup roller 14 and the paper feed rollers 15 in a short time. Therefore, as the motors 3A and 3B, the inner-rotor motor 3a having excellent responsiveness is used.

In the example illustrated in FIG. 2A, the number of magnetic poles of the rotor 32 is four. However, the number of magnetic poles of the rotor 32 is not limited to four and may be two or equal to or more than six. Furthermore, the number of slots of the stator 31 is not limited to six. In any case, the motor control devices 21A and 21B performs vector control (sensorless vector control) for estimating a magnetic pole position and a rotational speed by using a control model based on a d-q axis coordinate system on the motors 3A and 3B.

In the following description, a rotation angle position of the N pole indicated by a double circle among the S pole and the N pole of the rotor 32 may be referred to as a "magnetic pole position PS" of the rotor 32. Furthermore, a direction from the rotation center of the rotor 32 toward the magnetic pole position PS may be referred to as a "magnetic pole direction".

Figure 3:
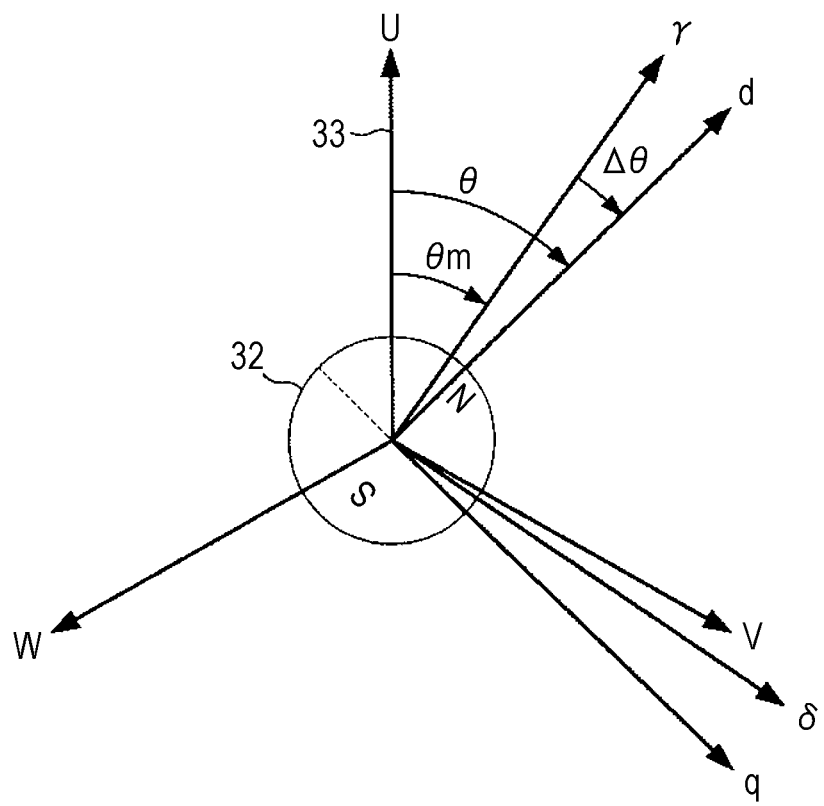
FIG. 3 is a diagram of a d-q axis model of the brushless motor.

FIG. 3 illustrates a d-q axis model of the motor 3. In the vector control of the motor 3, the three-phase alternating currents flowing in the windings 33 to 35 of the motor 3 are converted into direct currents flowing in two-phase windings for rotating in synchronization with the permanent magnet that is the rotor 32, and the control is simplified.

A magnetic flux direction (N pole direction) of the permanent magnet is defined as a d axis, and a direction advanced by $\pi/2$ [rad](90°) of an electrical angle from the d axis is defined as a q axis. The d axis and the q axis are model axes. With reference to the U-phase winding 33, a lead angle of the d axis with respect to the winding 33 is defined as θ. The angle θ indicates an angle position of the magnetic pole (magnetic pole position PS) with respect to the U-phase winding 33. The d-q coordinate system is located at a position advanced by the angle θ from the U-phase winding 33 as a reference.

Since the motor 3 does not includes a position sensor that detects an angle position (magnetic pole position) of the rotor 32, it is necessary for the motor control device 21 to estimate the magnetic pole position PS of the rotor 32. A γ axis is defined in correspondence with an estimated angle θm indicating the estimated magnetic pole position, and a δ axis is defined at a position advanced by an electrical angle of $\pi/2$ from the γ axis. A γ-δ coordinate system is located at a position advanced by the estimated angle θm from the U-phase winding 33 as a reference. A delay amount of the estimated angle θm with respect to the angle θ is defined as Δθ. When the delay amount Δθ is zero, the γ-δ coordinate system coincides with the d-q coordinate system.

Figure 4:
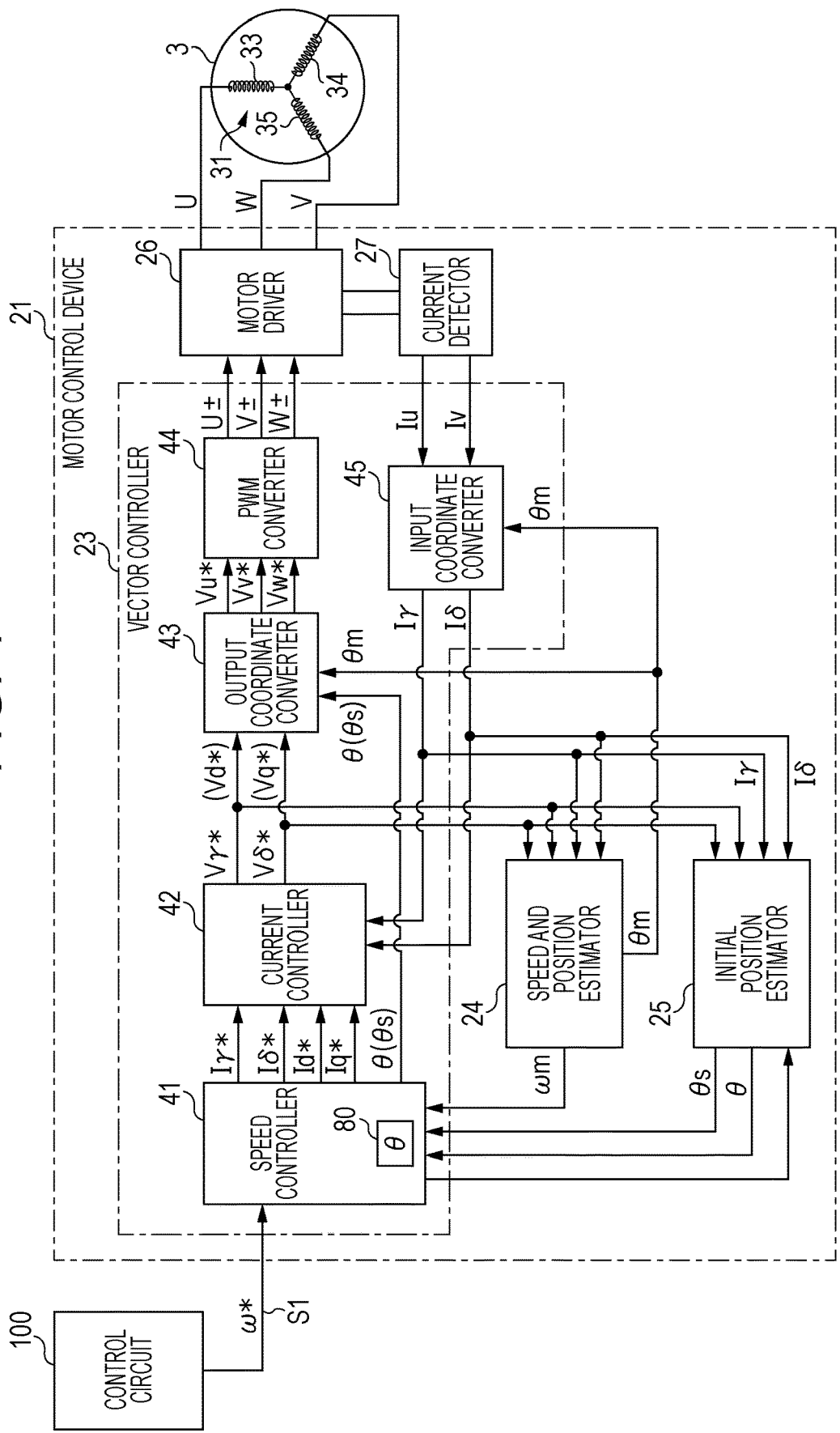
FIG. 4 is a diagram of an example of a functional configuration of the motor control device.
Figure 5:
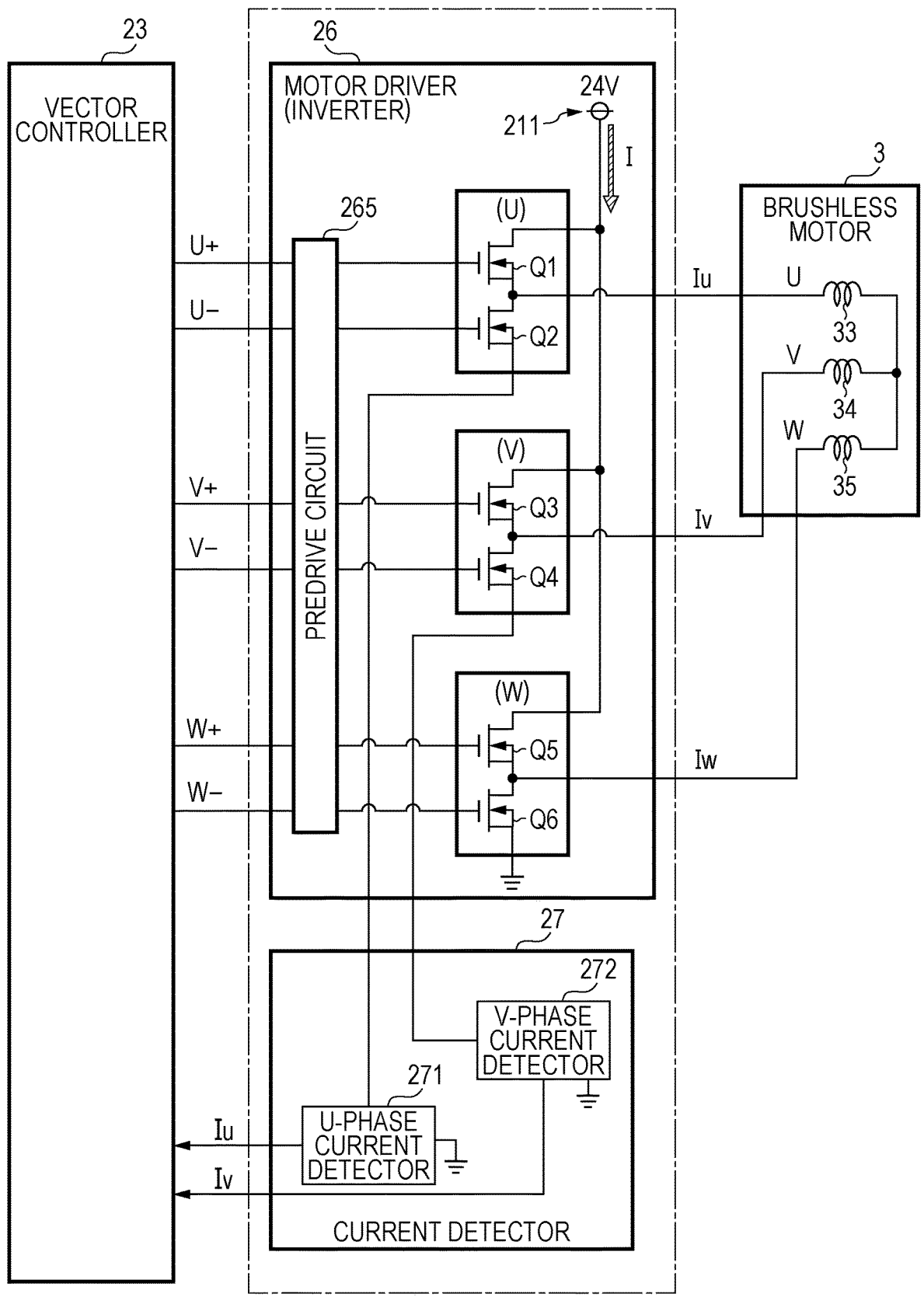
FIG. 5 is a diagram of an example of configurations of a motor driver and a current detector in the motor control device.
Figure 6A:
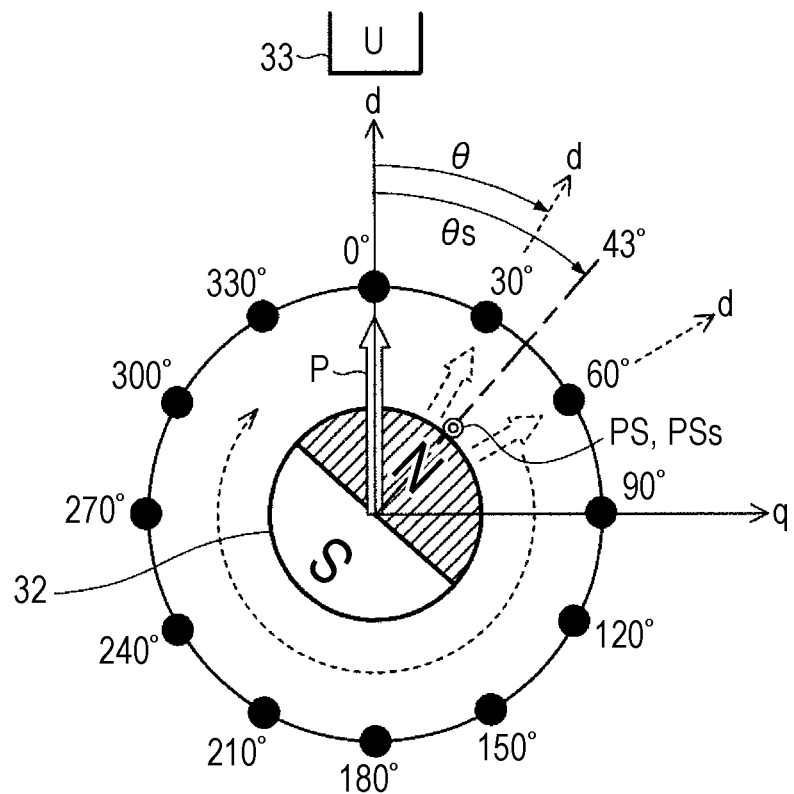
FIGS. 6A and 6B are diagrams of an outline of initial position estimation processing by full search.
Figure 6B:
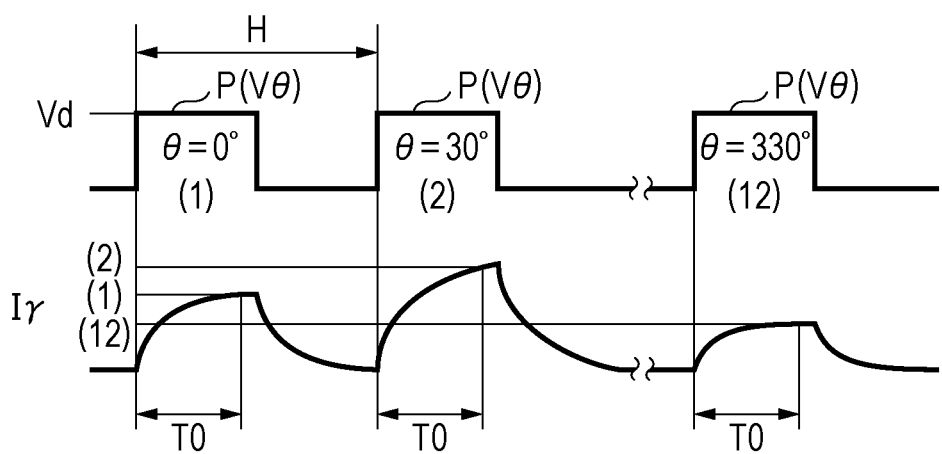
Figure 7:
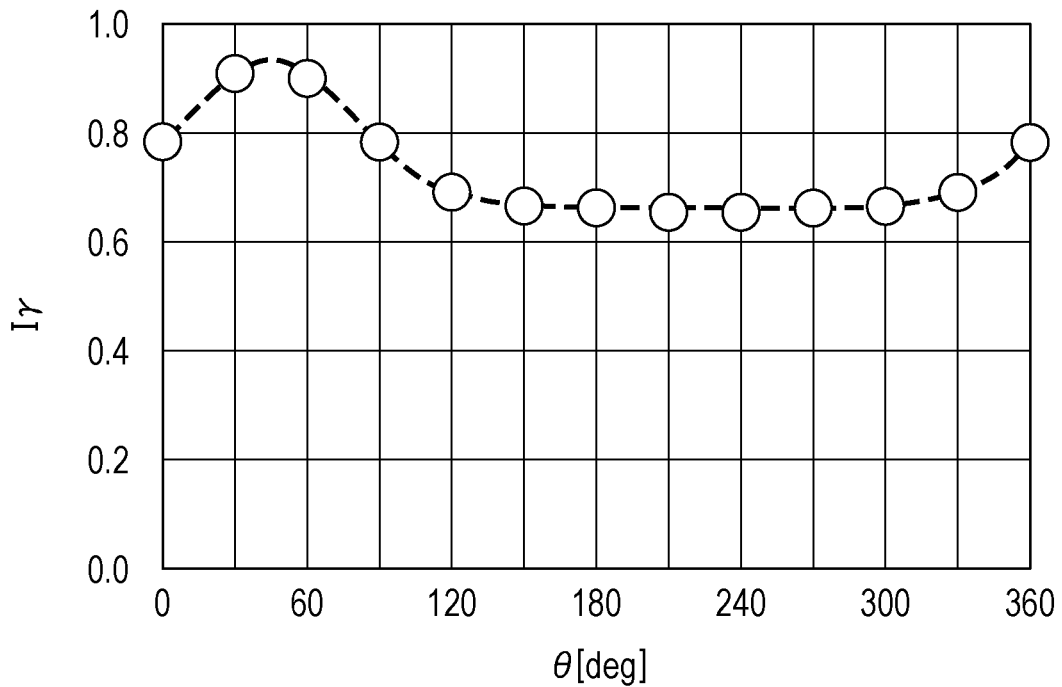
FIG. 7 is a diagram of an example of a measurement result of a current flowing in an armature in the initial position estimation by the full search.

FIG. 4 illustrates an example of a functional configuration of the motor control device 21, and FIG. 5 illustrates an example of configurations of a motor driver 26 and a current detector 27 of the motor control device 21. In addition, FIGS. 6A and 6B illustrate an outline of initial position estimation processing by full search, and FIG. 7 illustrates an example of a measurement result of a current flowing in an armature in the initial position estimation by the full search.

As illustrated in FIG. 4, the motor control device 21 includes a vector controller 23, a speed and position estimator 24, an initial position estimator 25, the motor driver 26, the current detector 27, and the like.

The motor driver 26 is a three-phase inverter that applies currents in the windings 33 to 35 of the motor 3 and drives the rotor 32. As illustrated in FIG. 5, the motor driver 26 includes transistors (for example, field-effect transistor: FET) Q1 to Q6 having the same characteristics for each phase, a predrive circuit 265, and the like.

The transistors Q1 to Q6 control a current I flowing from a DC power supply line 211 to a ground line via the windings 33 to 35. Specifically, the transistors Q1 and Q2 control a current Iu flowing in the winding 33, and the transistors Q3 and Q4 control a current Iv flowing in the winding 34. In addition, the transistors Q5 and Q6 control a current Iw flowing in the winding 35.

In FIG. 5, the predrive circuit 265 converts control signals U+, U−, V+, V−, W+, and W− input from the vector controller 23 into signals having voltage levels suitable for the respective transistors Q1 to Q6. The converted control signals U+, U−, V+, V−, W+, and W− are input to control terminals (gate) of the transistors Q1 to Q6.

The current detector 27 includes a U-phase current detector 271 and a V-phase current detector 272 and detects the currents Iu and Iv respectively flowing in the windings 33 and 34. Since Iu+Iv+Iw=0 is satisfied, the current Iw can be obtained by calculation based on the detected currents Iu and Iv.

The U-phase current detector 271 and the V-phase current detector 272 perform A/D conversion by amplifying a voltage drop caused by shunt resistances inserted into flow paths of the currents Iu and Iv and output the converted values as detection values of the current Iu and Iv. That is, two-shunt-type detection is performed. A resistance value of the shunt resistance is a small value in the order of $\frac{1}{10}\Omega$.

Returning to FIG. 4, the vector controller 23 controls the motor driver 26 according to a speed instruction value ω* included in an instruction S1 from the control circuit 100. When executing a job, the control circuit 100 applies the speed instruction value ω* corresponding to a process speed that has been set according to the job to the vector controller 23. Furthermore, when the image forming device 1 is turned on, when the job is executed, or when a power saving mode is returned to a normal mode, execution of the initial position estimation is instructed.

When being instructed to be activate, the vector controller 23 controls the motor driver 26 so as to generate the rotating magnetic field rotated from an initial position estimated and stored by the initial position estimator 25 prior to the activation.

The vector controller 23 includes a speed controller 41, a current controller 42, an output coordinate converter 43, a PWM converter 44, and an input coordinate converter 45. Each of the controllers and converters performs processing for the vector control of the motor 3 as follows.

Based on the speed instruction value ω* from the control circuit 100 and a speed estimation value ωm from the speed and position estimator 24, the speed controller 41 determines current instruction values Iγ* and Iδ* of the γ-δ coordinate system so that the speed estimation value ωm is close to the speed instruction value ω*.

The current controller 42 determines voltage instruction values Vγ* and Vδ* of the γ-δ coordinate system based on the current instruction values Iγ* and Iδ*.

Based on the estimated angle θm from the speed and position estimator 24, the output coordinate converter 43 converts the voltage instruction values Vγ* and Vδ* into a U-phase, V-phase, and W-phase voltage instruction values Vu*, Vv*, and Vw*.

The PWM converter 44 generates the control signals U+, U−, V+, V−, W+, and W− based on the voltage instruction values Vu*, Vv*, and Vw* and outputs the generated control signals to the motor driver 26. The control signals U+, U−, V+, V−, W+, and W− are signals used to control a frequency and an amplitude of the three-phase AC power to be supplied to the motor 3 by Pulse Width Modulation (PWM).

The input coordinate converter 45 calculates a value of the W-phase current Iw from the U-phase current Iu and the V-phase current Iv detected by the current detector 27. Then, estimated current values Iγ and Iδ of the γ-δ coordinate system are calculated based on the estimated angle θm from the speed and position estimator 24 and the values of the three-phase currents Iu, Iv, and Iw. That is, the three-phase current is converted into the two-phase current.

The speed and position estimator 24 obtains the speed estimation value ωm and the estimated angle θm according to a so-called voltage and current equation based on the estimated current values Iγ and Iδ from the input coordinate converter 45 and the voltage instruction values Vγ* and Vδ* from the current controller 42. The obtained speed estimation value ωm is input to the speed controller 41, and the obtained estimated angle θm is input to the output coordinate converter 43 and the input coordinate converter 45.

The initial position estimator 25 estimates an initial position PSs (refer to FIGS. 6A and 6B) that is the magnetic pole position PS of the rotor 32 that is stopped by using an inductive sensing method. The stopped state is not necessarily limited to a state where the rotor 32 is completely stopped and may be a state where a state immediately before a still state in which the rotor 32 rotates at a low speed close to zero or finely vibrates.

A method for estimating the initial position PSs is as follows.

For the initial position estimation according to the present embodiment, a method for applying a voltage pulse for searching an initial position for each of n angle positions equally dividing a search range of an electrical angle of 360 degrees into n sections, that is, a full search method is used.

The speed controller 41 controls the motor driver 26 so as to apply a pulse P (voltage pulse Vθ) illustrated in FIGS. 6A and 6B multiple times as changing the angle θ when the rotor 32 is stopped, as the initial position estimation processing by the full search.

In FIG. 6A, the pulse P is a vector, and the direction, that is, the angle θ of the pulse P is shifted by 30 degrees obtained by dividing a search range of the electrical angle of 360 degrees into 12 equal parts. That is, the pulse P is applied to each of 12 directions having a 30-degrees difference from each other.

In the following description, to apply the pulse P as changing the direction so as to estimate the initial position PSs may be referred to as "search".

When the pulse P is applied for searching, the current flows in each of the windings 33 to 35 according to the angle θ of the pulse P. A magnitude of the current is inversely proportional to impedances of the windings 33 to 35 corresponding to the angle θ of the pulse P. The impedances of the windings 33 to 35 mainly depend on inductances of the windings 33 to 35, and are the lowest in the d axis that is the N-pole direction of the permanent magnet. Therefore, when the current flowing by the application of the pulse P is maximized, the angle position of the pulse P is the d axis. In a case where the angle θ of the pulse P is set to the angle position with respect to the U-phase winding 33, the angle θ of the pulse P is the d axis.

Since a magnetic field (magnetic field vector) is generated by the application of the pulse P, the magnetic field may generate a torque for rotating the rotor 32. When the torque is generated, there is a case where the rotor 32 rotates and the magnetic pole position changes.

In the present embodiment, to prevent the rotation of the rotor 32 as possible, a second pulse P is generated to generate a magnetic field vector in other angle θ in which a torque is generated that rotates the rotor 32 in a second direction opposite to a first direction that is the direction of the rotation caused by the torque generated by application of a first pulse P. In addition, to make the torque generated by the second pulse P be larger than the torque generated by the first pulse P, the number of the second pulses P is increased, or the magnitude of the pulse P is increased.

In the vector control in the search, at the time of actual processing to control the motor driver 26, the pulse P can be applied by controlling the voltage instruction values Vγ* and Vδ* to be input to the output coordinate converter 43. However, in the search, voltage instruction values Vd* and Vq* are used instead of the voltage instruction values Vγ* and Vδ*. That is, in this case, the pulse P can be applied by setting the voltage instruction value Vq* to zero, setting the voltage instruction value Vd* to an appropriate value, and designating the angle θ.

After current instruction values Id* and Iq* are applied to the current controller 42 instead of the voltage instruction values Vd* and Vq* and the angle θ is corrected according to an angle difference between the current instruction and the voltage instruction, the corrected angle θ may be input to the current controller 42 or the output coordinate converter 43. In this case, the current controller 42 generates the voltage instruction values Vd* and Vq* for applying the pulse P based on the input current instruction values Id* and Iq*.

For example, as illustrated in FIG. 4, as the processing for searching, the speed controller 41 applies the current instruction values Id* and Iq* to the current controller 42 and inputs the angle θ stored as angle setting information 80 to the output coordinate converter 43. For example, the angle θ starts from zero and is increased to 330 degrees (11 π/6) by 30 degrees (π/6) each time when the pulse P is applied.

The current controller 42 determines the voltage instruction values Vγ* and Vδ* based on the current instruction values Id* and Iq* instead of the current instruction values Iγ* and Iδ*. That is, in the initial position estimation processing, the voltage instruction values Vd* and Vq* are determined corresponding to the current instruction values Id* and Iq*. If the voltage instruction value Vq* is set to zero, an angle of the voltage instruction value Vd* coincides with the angle θ of the pulse P.

As described above, the position and the voltage value of the pulse P may be set by directly outputting the voltage instruction values Vd* and Vq* by the current controller 42 without using the current instruction values Id* and Iq*.

The output coordinate converter 43 converts the voltage instruction values Vγ* and Vδ* into the voltage instruction values Vu*, Vv*, and Vw* based on the angle θ instead of the estimated angle θm. The PWM converter 44 generates the control signals U+, U−, V+, V−, W+, and W− based on the voltage instruction values Vu*, Vv*, and Vw*, and the motor driver 26 applies the pulse P to the motor 3 according to the control signals U+, U−, V+, V−, W+, and W−.

The waveform of each pulse P illustrated in FIG. 6B includes uniform rectangles. However, the waveform of the voltage that is actually applied to the motor 3 has a large number of kinds of rectangles on which pulse width modulation has been executed, for example, for each of the U-phase, the V-phase, and the W-phase with a clock period of 10 kHz to 20 kHz.

As illustrated in FIG. 6B, the estimated current value Iγ flowing in each of the windings 33 to 35 increases along with the application of each pulse P and decreases along with the termination of the application of each pulse P. The increase and the decrease are exponential changes Each pulse P is applied at a timing when the estimated current value Iγ that has been increased due to application of the previous pulse P is reduced to a level before the increase. A period H of the application of the pulse P is, for example, about 0.5 to 1 ms.

The initial position estimator 25 fetches the estimated current values Iγ and Iδ at the time when a time T0 shorter than a pulse width of the pulse P has elapsed from a rising edge of each pulse P from the input coordinate converter 45. In a case where the pulse P is applied 12 times, 12 estimated current values Iγ are sequentially fetched. The estimated current values Iγ and Iδ correspond to the current I flowing in the windings 33 to 35 of the stator 31.

In the example illustrated in FIG. 6A, an initial angle θs which is an angle corresponding to the initial position PSs is about 43 degrees. Therefore, in FIG. 7, the estimated current value Iγ at the time when the search angle θ is 30 degrees or 60 degrees close to the initial angle θs is larger than the estimated current value Iγ at the other time, particularly, when the angle θ is 210 degrees or 240 degrees close to an opposite position of the initial position PSs.

The initial position estimator 25 estimates the angle θ corresponding to the maximum estimated current value Iγ among the 12 fetched estimated current values Iγ as the initial angle θs. Alternatively, the predetermined number, that is, two or more estimated current values Iγ are extracted from the 12 estimated current values Iγ in descending order, and an angle at which the estimated current value Iγ is maximized is calculated by interpolation calculation based on the extracted predetermined number of estimated current values Iγ as the initial angle θs.

The speed controller 41 inputs the notified initial angle θs to the output coordinate converter 43 as an initial value of the estimated angle θm when the rotor 32 starts to rotate. As a result, the motor driver 26 is controlled so as to rotate the rotor 32 from the estimated initial position PSs.

Figure 8:
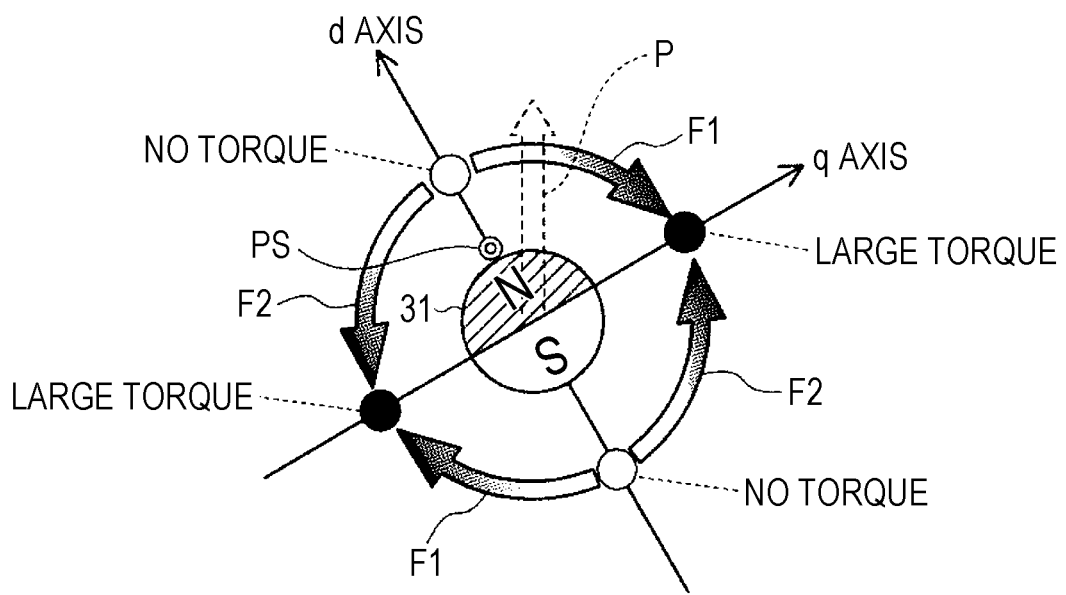
FIG. 8 is a diagram of a relation between a direction of a voltage pulse for searching a magnetic pole position and a torque for rotating a rotor.
Figures 9A, 9B:
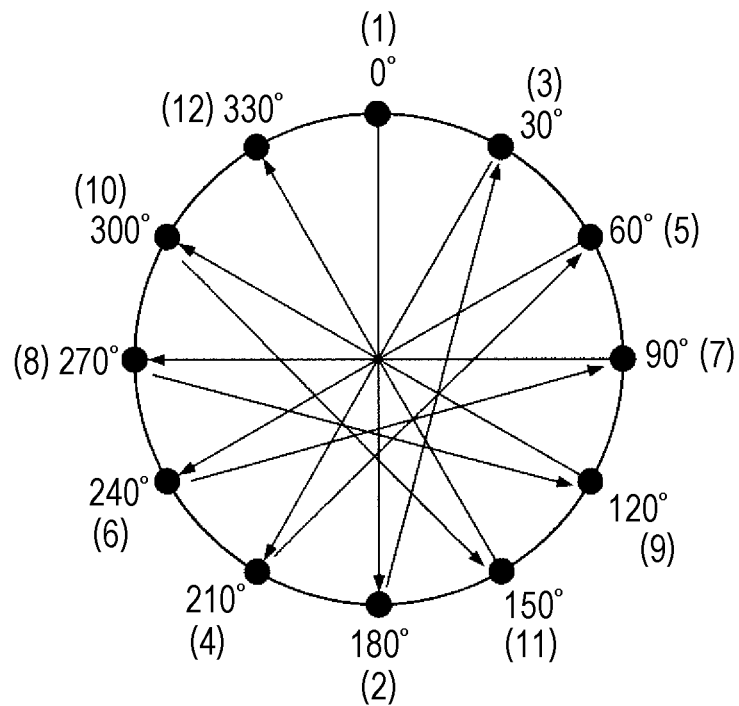
FIGS. 9A and 9B are diagrams of a basic search order for suppressing a displacement of the magnetic pole position.
Figure 10:
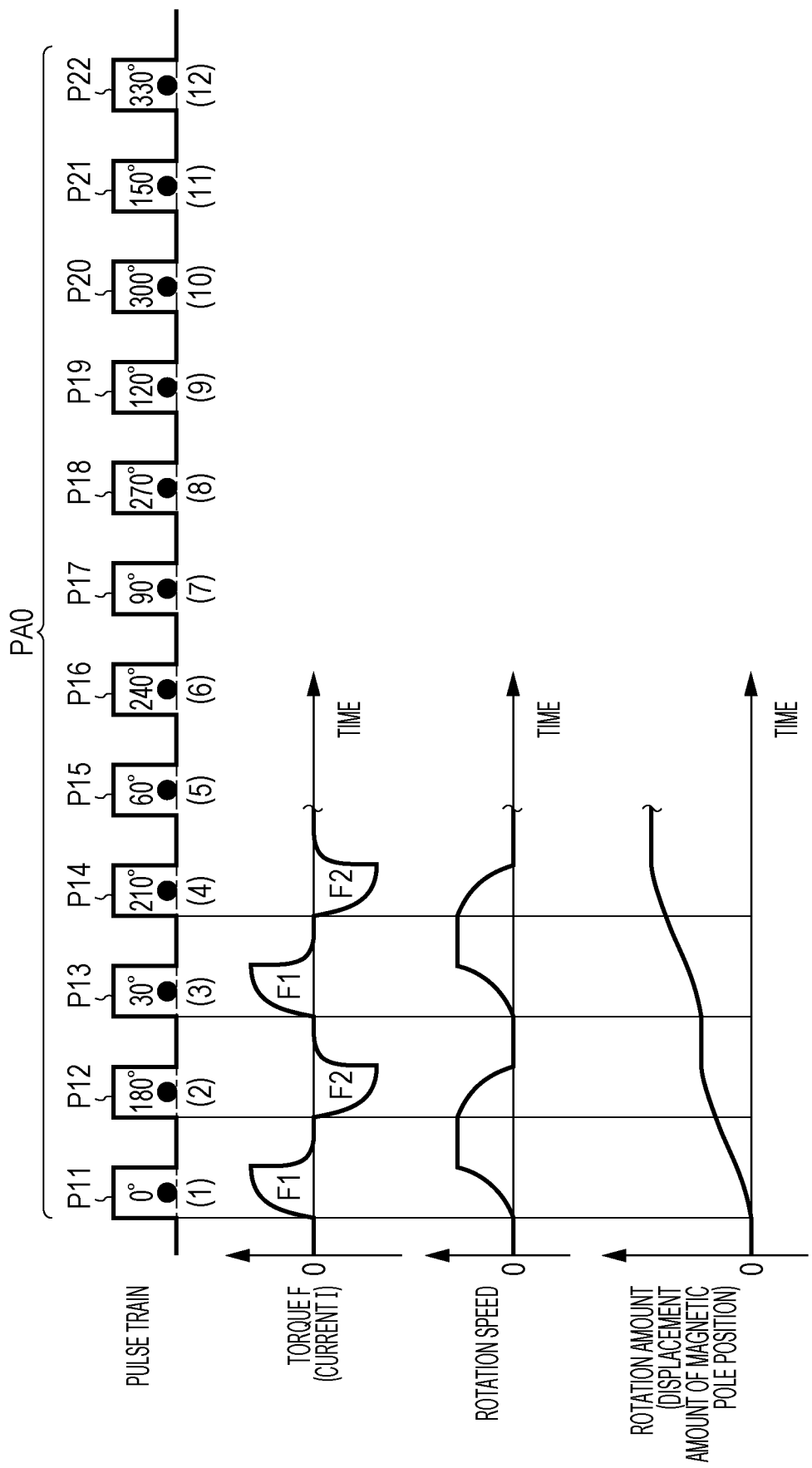
FIG. 10 is a diagram illustrating a configuration and an action of a pulse train regarding the search order in FIGS. 9A and 9B.

FIG. 8 illustrates a relation between the direction of the pulse P (voltage pulse Vθ) for searching the magnetic pole position PS and torques F1 and F2 for rotating the rotor 32, and FIGS. 9A and 9B illustrate a basic search order for suppressing a displacement of the magnetic pole position PS. FIG. 10 illustrates a configuration and an action of a pulse train PA0 according to the search order in FIGS. 9A and 9B.

In the initial position estimation, depending on a positional relation between the direction of the generated pulse P and the magnetic pole position PS at that time, there is a case where the torque F for rotating the rotor 32 is generated. That is, in FIG. 8, if a direction of the magnetic field vector caused by the pulse P fortuitously coincides with the d axis passing through the magnetic pole position PS, the torque F is not generated, and a holding force for suppressing the rotation is generated. However, in a case where the direction of the magnetic field vector does not coincide with the d axis, the torque F1 in the first direction or the torque F2 in the second direction is generated. Then, the torques F1 and F2 are larger as the direction of the magnetic field vector is closer to the q axis.

When the torque F having a magnitude that can offset an inertial force is generated, the rotor 32 rotates, and the magnetic pole position PS is displaced. The displacement of the magnetic pole position PS deteriorates accuracy of the initial position estimation. The deterioration in the accuracy causes a delay in rising at the time when the motor 3 is activated and the like.

To reduce a displacement amount of the magnetic pole position PS from the start to the end of the initial position estimation, as illustrated in FIGS. 9A and 9B, it is considered to differ a direction (angle) of an odd-numbered pulse P and a direction of an even-numbered pulse P from each other by 180 degrees.

In the examples illustrated in FIGS. 9A and 9B, the first, third, fifth, seventh, ninth, and eleventh angles θ are respectively set to 0°, 30°, 60°, 90°, 120°, and 150°. Then, the second, fourth, eighth, tenth, and twelfth angles θ are respectively set to 180°, 210°, 240°, 270°, 300°, and 330°. That is, the pulse train PA0 including 12 pulses P11 to P22 illustrated in FIG. 10 is applied.

In the search in which the pulse train PA0 is applied, for example, in a case where the torque F1 is generated when the first pulse P11 is applied as illustrated in FIG. 10, the torque F2 in the opposite direction is generated when the second pulse P12 is applied.

If the motor 3 is an outer-rotor type, even when the rotor 32 rotates due to the generation of the torque F, a rotation speed decreases as the torque F decreases along with the completion of the application of the pulses P11 and P12, and the rotation stops before the next pulse is applied.

However, in a case where an inner-rotor motor is used as the motor 3 as described above, there is a case where the rotor 32, that has started to move by the application of the first pulse P11, inertially continues to rotate after the completion of the application of the pulse P11. However, since the period of the pulse application is short, a rotation amount until the second pulse P12 is applied is about 1° and is sufficiently smaller than a divided angle of the search range (30° in this example).

A magnitude of the torque F2 caused by the second pulse P12 is substantially equal to a magnitude of the torque F1 caused by the first pulse P11.

However, although the torque F2 caused by the second pulse P12 acts as a brake for stopping inertial rotation of the rotor 32, the torque F2 does not act as a driving force for stopping and reversely rotating the rotor 32. That is, the displacement amount of the magnetic pole position PS until the inertial rotation is stopped is not reduced even when the pulse P12 is applied.

The third pulse P13 is applied in a state where the rotor 32 is stopped. As long as the direction of the magnetic field vector caused by the application does not coincide with the magnetic pole direction, the torque F is generated to some extent. The torque F may be smaller or larger than the torque F1 caused by the first pulse P11. Furthermore, although the directions of the first pulse and the torque F1 are the same in FIGS. 9A and 9B, there is a case where the direction of the first pulse is opposite to the direction of the torque F1.

In either case, when a newly generated torque F rotates the rotor 32, as in a case where the first and the second pulses are applied, the magnetic pole position PS is displaced when the third and the fourth pulses are applied, and the displacement amount is not reduced. That is, the displacement amount increases from the start of the initial position estimation.

Thereafter, each time when the odd-numbered pulses P15, P17, P19, and P21 are applied, the displacement amount increases.

The displacement of the magnetic pole position PS during the initial position estimation deteriorates the accuracy of the estimation, and affects timing setting of sheet feed control of the sheet 2 as described below.

Figure 11A:
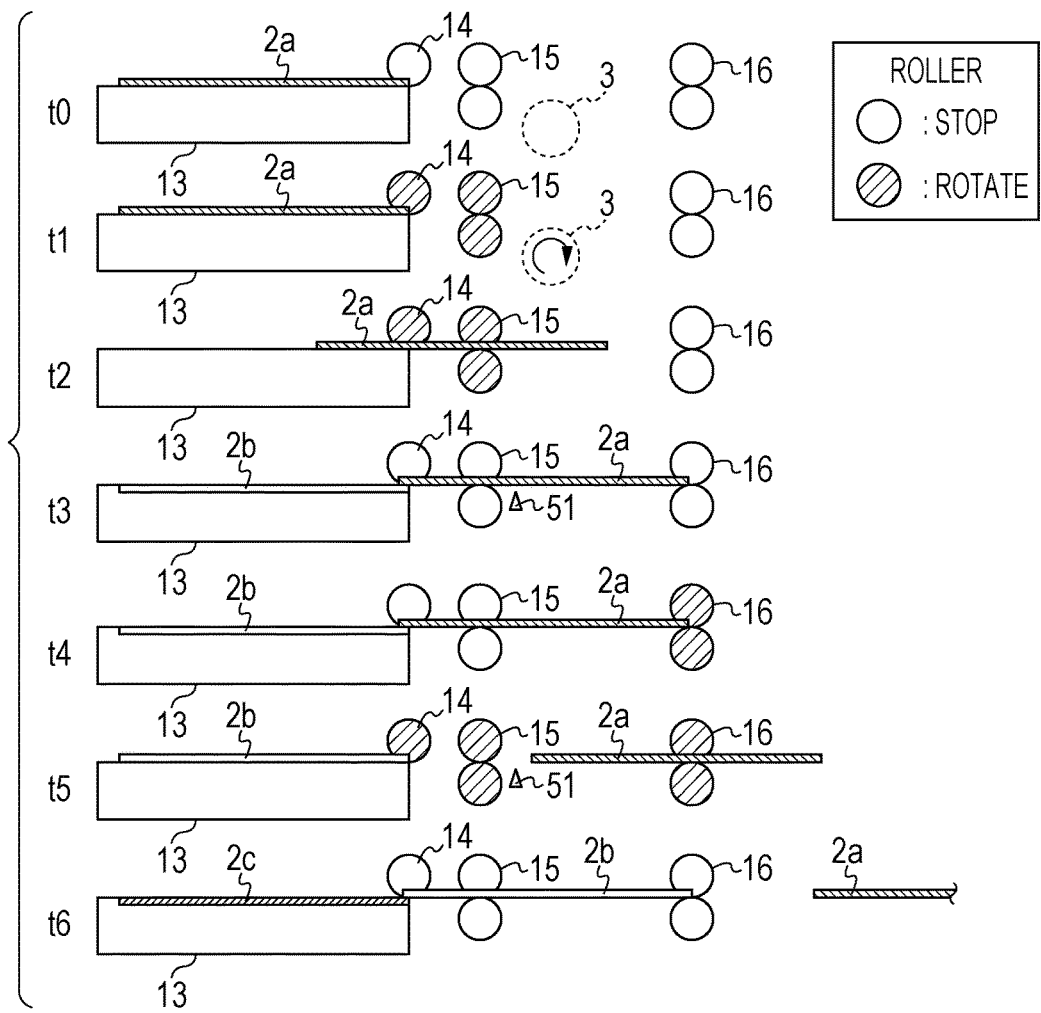
FIGS. 11A to 11C are diagrams of an example of a rotation drive sequence of rollers for feeding paper.
Figure 11B:
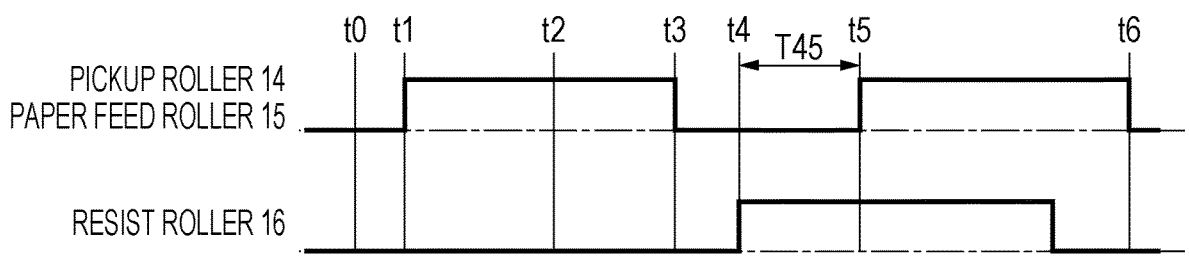
Figure 11C:
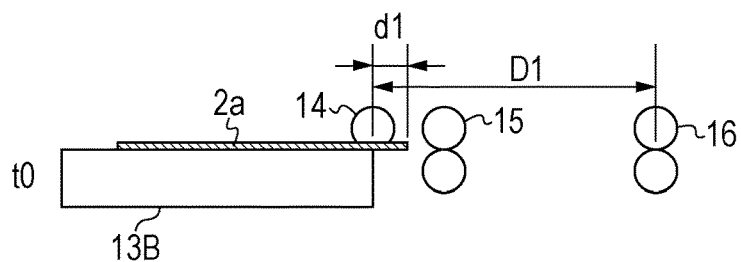

FIGS. 11A to 11C illustrate an example of a rotation drive sequence of the rollers for feeding the sheet. More specifically, FIG. 11A illustrates a plurality of stages of a sheet feeding operation in the multi-printing job, and FIG. 11B illustrates a timing of roller control. FIG. 11C illustrates an example of a displacement of a sheet 2a caused by the rotation of the motor 3 during the initial position estimation.

In FIGS. 11A and 11B, a paper feed roller group (collective name of pickup roller 14 and pickup rollers 15) and the resist rollers 16 are stopped at a timing t0. At this time, it is assumed that the initial position PSs of the motor 3 for driving the paper feed roller group have been already estimated.

At a timing t1, the motor 3 is activated, and the paper feed roller group starts to rotate. At a timing t2, the uppermost sheet 2a is drawn from the paper feed tray 13 and is conveyed toward the resist rollers 16.

Thereafter, when the sheet 2a reaches the resist rollers 16, the paper feed roller group is stopped (timing t3). In a first half of the conveyance (paper feed) from the paper feed tray 13 to the resist rollers 16, the motor 3 is controlled to rotate at a high speed to enhance productivity, and in a latter half, the motor 3 is controlled to be decelerated so as to stop the sheet 2 at the position of the resist roller 16. The deceleration is started at a predetermined timing based on an output of a sheet sensor 51 arranged in the vicinity of the downstream side of the paper feed roller 15.

At a timing t4 suitable for positioning the image and the sheet 2 at the time of the secondary transfer (registration), the resist rollers 16 start to rotate, and the sheet 2a is sent to the printing position 90. At this time, the paper feed roller group is stopped.

At a timing t5 after the timing t4, the paper feed roller group rotates again, and feeding of a second sheet 2b starts. By setting a time T45 from the timing t4 to the timing t5, a distance (sheet interval) between the sheets 2a and 2b can be adjusted. Prior to restart of the paper feeding, the initial position PSs of the motor 3 may be estimated again as necessary in a period from a time when the first sheet 2a has passed through the paper feed rollers 15 to the timing t5.

At a timing t6, when the sheet 2b reaches the resist rollers 16, the paper feed roller group stops. Thereafter, the sheet 2b is sent to the printing position 90 as the first sheet, and a third sheet 2c is fed.

When the magnetic pole position PS of the motor 3 is displaced in the initial position estimation before starting the series of sheet feeding operations, the pickup roller 14 rotates. Therefore, as illustrated in FIG. 11C, there is a case where the sheet 2a is fed by a length d1 at the timing t0. In this case, since a conveyance distance D1 in the paper feeding is shortened by the length d1, it is necessary to slow down a conveyance speed to stop the sheet 2a at the position of the resist roller 16. When the conveyance speed is slowed down, it is necessary to increase a sheet interval to prevent overlap of the subsequent sheet 2b. Therefore, the productivity in multi-printing is lowered.

Furthermore, for example, in a case where the upper paper feed tray 13A is used on a daily basis and the lower paper feed tray 13B is occasionally used, the motor 3B of the motors 3A and 3B is often not activated although the initial position estimation is performed when the motor 3B is turned on. That is, the displacement amount of the magnetic pole position PS in each initial position estimation is continuously accumulated. Therefore, when the paper feed tray 13B is occasionally used, the length d1 of the fed sheet 2 is considerably longer than that of the paper feed tray 13A. Accordingly, there is a possibility that the sheet 2 is excessively sent to the resist rollers 16 and a jam occurs.

Therefore, the image forming device 1 has a function for reducing the displacement amount of the magnetic pole position PS by searching the initial position PSs in order obtained by improving the search order illustrated in FIGS. 9A and 9B. Hereinafter, the configuration of the operation of the image forming device 1 will be described with a focus on the improved search order.

In the present embodiment, it is assumed that the number n of the directions in which the pulse P is generated be 12, that is an integral multiple of four, and the divided angle of the search range having the electrical angle of 360 be 30°. However, the number is not limited to this, and the number n may be a value equal to or more than twice of four, for example, 72 to eight. In that case, the divided angle is a value within a range between five to 45°.

Figures 12A, 12B:
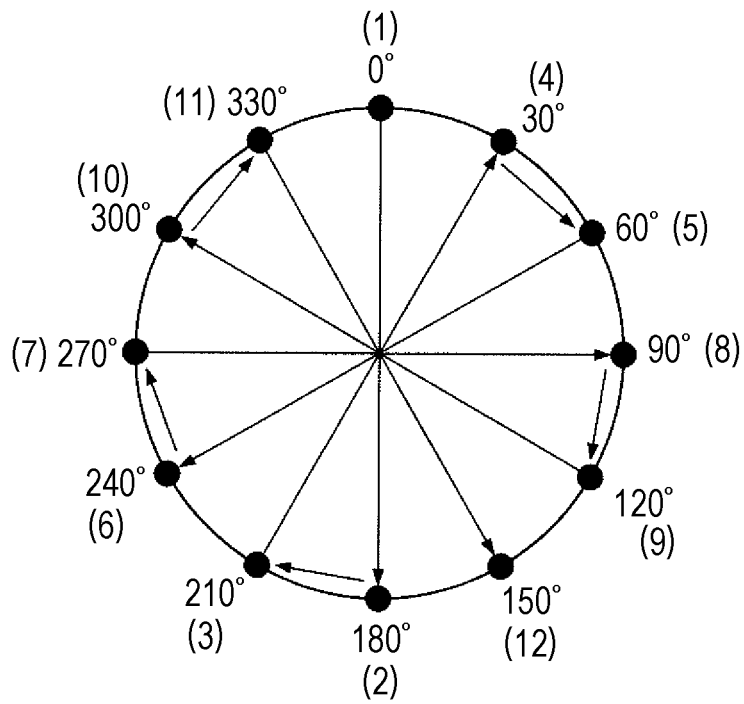
FIGS. 12A and 12B are diagrams of a first example of an improved search order.
Figure 13:
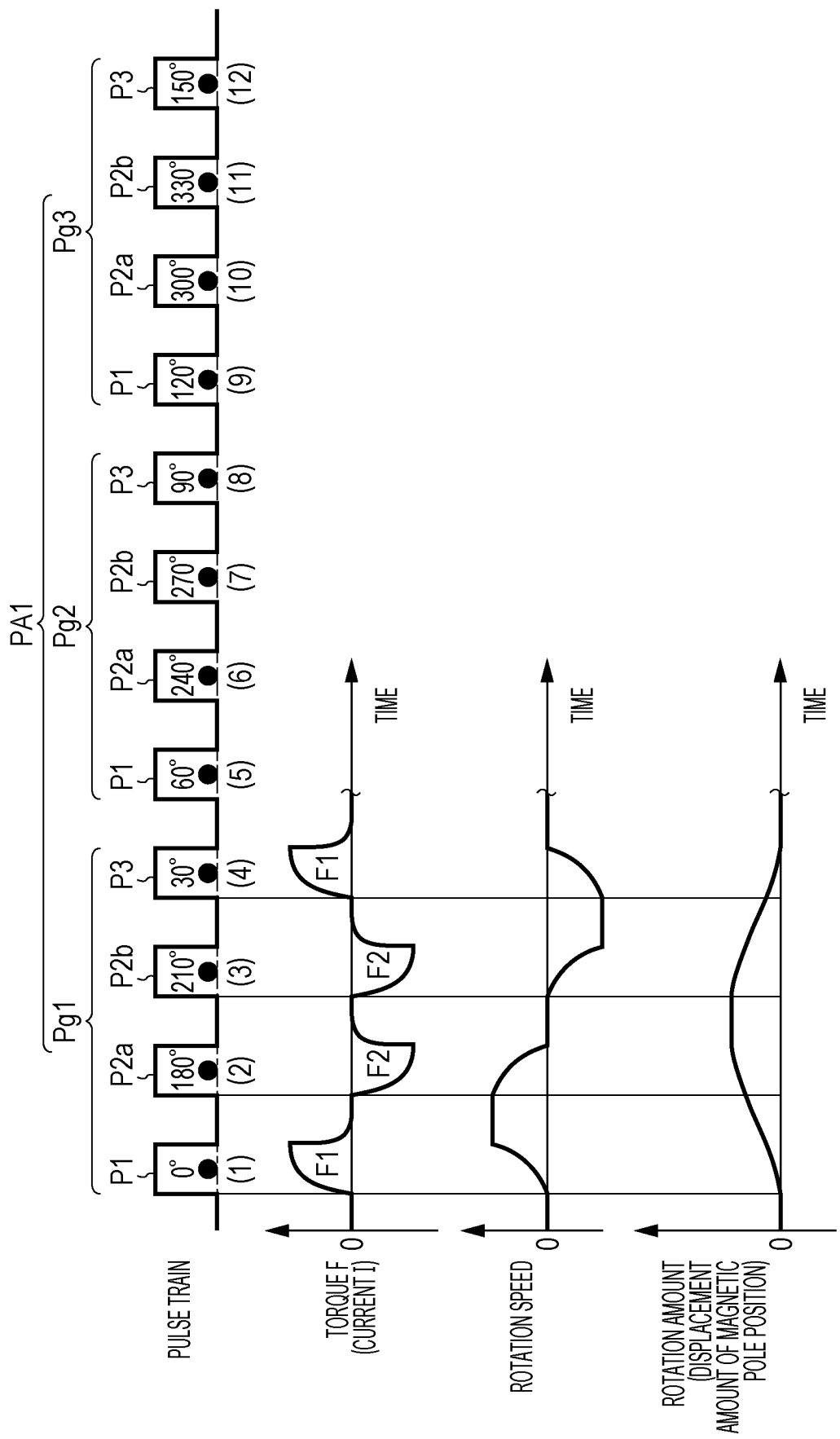
FIG. 13 is a diagram illustrating a configuration and an action of a pulse train according to the first example in FIGS. 12A and 12B.

FIGS. 12A and 12B illustrate a first example of the improved search order, and FIG. 13 illustrates a configuration and an action of a pulse train PA1 according to the first example in FIGS. 12A and 12B.

In the search performed in the order in the first example in FIGS. 12A and 12B, the pulse train PA1 illustrated in FIG. 13 is applied. The number of pulses in the pulse train PA1 is 12, which is the same as the number of search angles θ. That is, each of the 12 pulses of the pulse train PA1 generates a magnetic field vector at an angle θ that does not correspond to the other pulse, and the current I flowing in the windings 33 to 35 is measured each time when the pulse is applied. Black circles in FIGS. 12A and 12B indicate that the current I is measured when the pulse is applied. The number of pulses is equal to the number of times of measurement of the current I as in the search in the order illustrated in FIGS. 9A and 9B.

The pulse train PA1 is a pulse train in which three groups Pg1, Pg2, and Pg3 are connected in total. Each of the three groups Pg1, Pg2, and Pg3 includes four pulses P1, P2a, P2b, and P3.

The illustrated pulse train PA1 schematically indicates an application period of a voltage that has been actually pulse-width-modulated for each of the U-phase, the V-phase, and the W-phase and applied to the motor 3. This applies to the other examples below.

In each of the groups Pg1, Pg2, and Pg3, a first pulse P1 is a first pulse that is a pulse P at a first angle θ1 which is one of 12 angles θ. The first angle θ1 is determined so as not to overlap with a first angle θ1 corresponding to a first pulse P1 of other group.

Second and third two pulses P2a and P2b are second pulses to be sequentially applied to a second angle θ2 and a third angle θ3 in which the torque F for rotating the rotor 32 in the second direction opposite to the first direction that is the rotation direction of the rotor 32 in a case where the torque F for rotating the rotor 32 is generated by applying the first pulse P1. The second angle θ2 is an angle θ separated from the first angle θ1 by equal to or more than ±90° (for example, 180°). In addition, in this example, the third angle θ3 is an angle θ that is closest to the second angle θ2 among the angles θ that do not corresponding to the pulses of the other group.

Then, a fourth pulse P3 is a third pulse for generating a magnetic field vector at a fourth angle θ4 in which the torque F for rotating the rotor 32 in the first direction same as the rotation caused by the first pulse P1 is generated. The fourth angle θ4 is an angle θ separated from the third angle θ3 by equal to or more than ±90° (for example, 180°).

In the first example, the first angle θ1, the second angle θ2, the third angle θ3, and the fourth angle θ4 of the group Pg1 are sequentially set to 0°, 180°, 210°, and 30°. As in the group Pg1, in the group Pg2, the angles are sequentially set to 60°, 240°, 270°, and 90°, and in the group Pg3, the angles are sequentially set to 120°, 300°, 330°, and 150°.

As illustrated in FIG. 13, for example, if the torque F1 is generated when the first pulse P1 (first pulse) of the leading group Pg1 is applied, the rotor 32 starts to rotate. The rotor 32 inertially continues to rotate after the completion of the application of the pulse P1.

When the second pulse P2a (first second pulse) is applied, the torque F2 in the opposite direction is generated. Accordingly, the inertial rotation of the rotor 32 is stopped. However, the displacement amount of the magnetic pole position PS until the inertial rotation is stopped cannot be reduced by the torque F2 caused by the pulse P2a.

The situation up to here is similar to the situation when the pulses P11 and P12 are applied in FIG. 10.

Unlike the case in FIG. 10, the torque F2 in the direction same as the torque F2 caused by the second pulse P2a is generated by applying a third pulse P2b (second second pulse). Accordingly, although the generation timings are different from each other, a total amount of the torque F2 is increased that is generated after the displacement of the magnetic pole position PS is started by the first pulse P1 and acts to suppress the displacement.

That is, since the torque F2 caused by the pulse P2b is added to the torque F2 caused by the pulse P2a, an action for stopping and reversely rotating the rotor 32 is generated in addition to an action for rotating the rotor 32.

The reverse rotation started by the application of the third pulse P3 decreases the displacement amount of the magnetic pole position PS. However, after the application of the pulse P3 has been completed, the rotor 32 inertially continues to rotate.

When the fourth pulse P4 (third pulse) is applied, the torque F1 in the direction same as the torque F1 caused by the first pulse P1 is generated. The torque F1 stops the inertial reverse rotation caused by the third pulse P3.

As a result, by cancelling the displacement of the magnetic pole position PS caused by the first and the second pulses P1 and P2a by the third and the fourth pulses P2b and P3, the magnetic pole position PS substantially returns to the original position. Even if the magnetic pole position PS is not completely returned to the original position, at least, the displacement amount of the magnetic pole position PS is decreased.

Configurations of the groups Pg2 and Pg3 other than the leading group are basically similar to the configuration of the group Pg1 except for that the values of the angles θ1 to θ4 corresponding to the respective pulses are different. That is, each group includes the pulse P1 that is the first pulse to search the single angle θ and the two pulses P2a and P2b that are the second pulses for stopping the rotation and reversely rotating the rotator 32, and the pulse P3 that is the third pulse for stopping the reverse rotation. Therefore, in the groups Pg2 and Pg3, as in the group Pg1, in a case where the torque having a magnitude for rotating the rotor 32 is generated in each group and the magnetic pole position PS is displaced, an effect for returning the magnetic pole position PS to the original position is obtained.

Arrangement orders of the groups Pg1, Pg2, and Pg3 are not limited to the examples, and can be arbitrarily exchanged in group units. For example, the leading group may be set as the group Pg3. In that case, an angle θ of a first pulse P is set to 90°.

Figure 14:
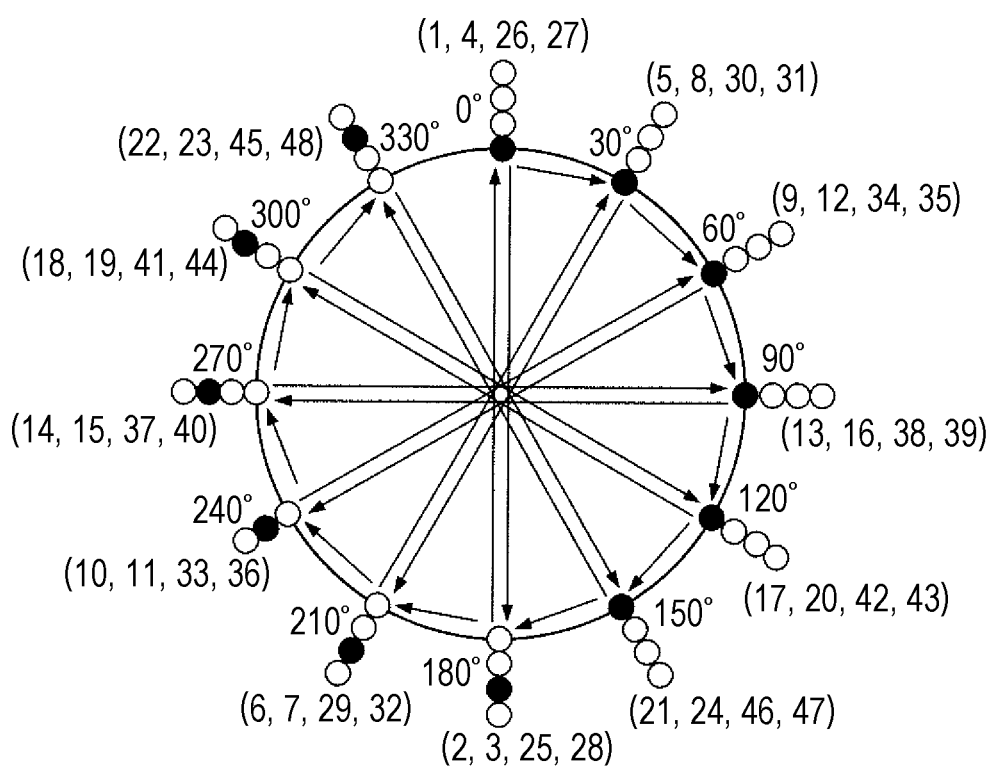
FIG. 14 is a diagram of a second example of an improved search order.
Figure 16:
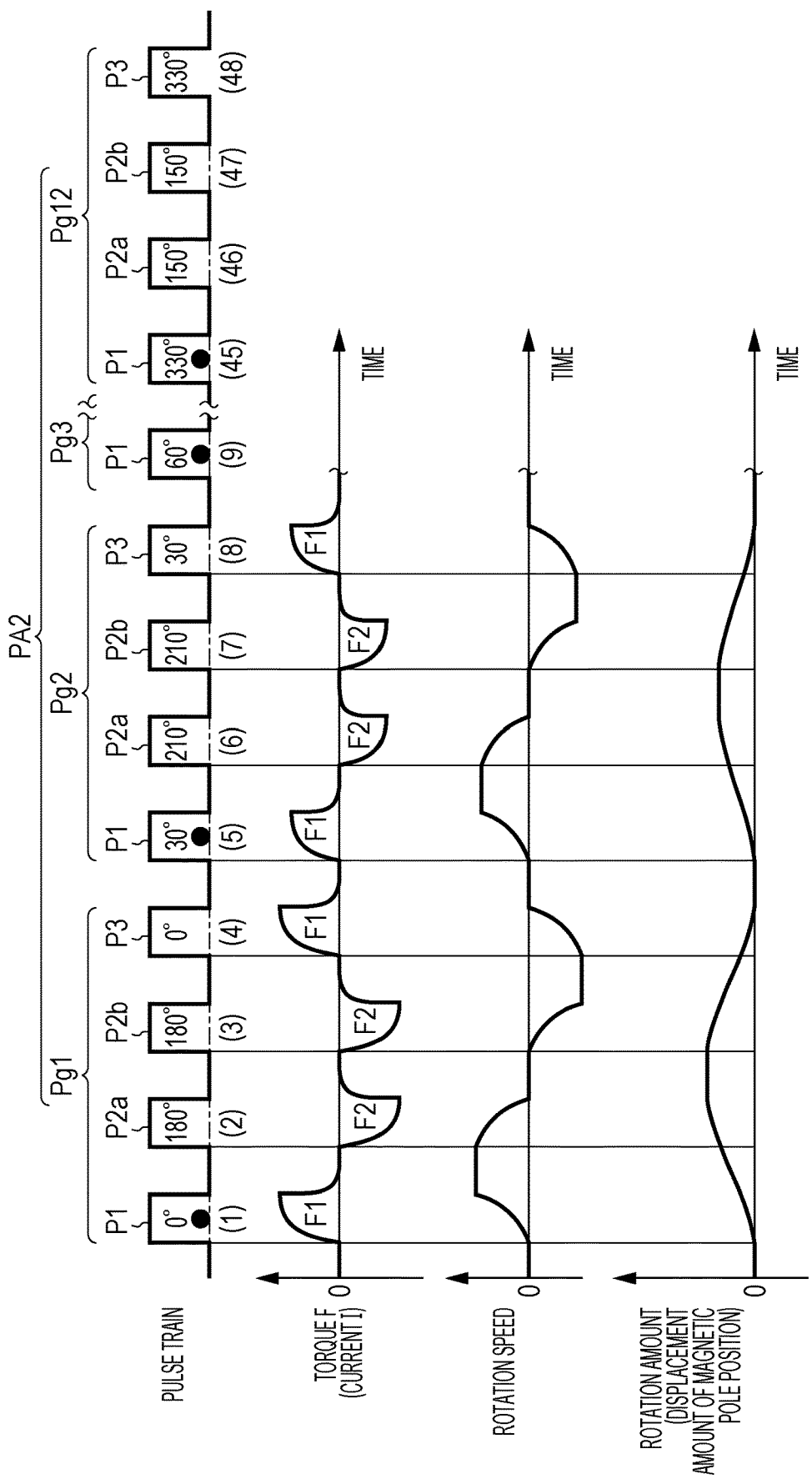
FIG. 16 is a diagram illustrating a configuration and an action of a pulse train according to the second example in FIGS. 14 and 15.

FIGS. 14 and 15 illustrate a second example of the improved search order, and FIG. 16 illustrates a configuration and an action of a pulse train PA2 according to the second example in FIGS. 14 and 15.

In the search performed in the order in the second example, the pulse train PA2 illustrated in FIG. 16 is applied. The number of pulses of the pulse train PA2 is 48 which is larger than 12 which is the number n of the search angles θ. The pulse train PA2 includes a pulse to be applied to reduce the displacement amount of the magnetic pole position PS in addition to the 12 pulses necessary for measuring the current I.

The pulse train PA2 is a pulse train in which 12 groups Pg1, Pg2, Pg3, Pg4, Pg5, Pg6, Pg7, Pg8, Pg9, Pg10, Pg11, and Pg12 as many as the number n of the search angles θ are connected. Each of the groups Pg1 to Pg12 includes four pulses P1, P2a, P2b, and P3.

As described above, the pulse P1 is the first pulse at the first angle θ1, and the pulses P2a and P2b are the second pulses at the second angle θ2 or the third angle θ3. The pulse P3 is the third pulse at the fourth angle θ4.

A difference between the groups Pg1 to Pg12 of the pulse train PA2 in the second example and the groups Pg1 to Pg3 in the first example illustrated in FIGS. 12A and 12B is values of the second angle θ2, the third angle θ3, and the fourth angle θ4.

In the first example, the value of the second angle θ2 is different from the value of the third angle θ3. Whereas, in the second example, the values of the second angle θ2 and the third angle θ3 are the same value separated from the first angle θ1 by 180°. Furthermore, in the first example, the value of the first angle θ1 is different from the value of the fourth angle θ4. Whereas, in the second example, the value of the first angle θ1 is the same as the value of the fourth angle θ4.

For example, the first angle θ1, the second angle θ2, the third angle θ3, and the fourth angle θ4 of the group Pg1 in the second example respectively set to 0°, 180°, 180°, and 0°. In the group Pg2, the angles are sequentially set to 30°, 210°, 210°, and 30°, and in the final group Pg12, the angles are sequentially set to 330°, 150°, 150°, and 330° as in the group Pg2.

According to the initial position estimation for applying the pulse train PA2 in the second example, in each of the groups Pg1 to Pg12, the magnetic field vector caused by the pulses P1 and P2a is opposite to the magnetic field vector caused by the pulses P2b and P3, and the torque F for displacing the magnetic pole position PS is equal to the torque F for returning the displacement. As a result, even when the magnetic pole position PS is displaced by the application of the pulse P1, the magnetic pole position PS is more reliably returned to the original position when the application of the pulse P3 is completed.

By combining the four pulses P1, P2a, P2b, and P3, an effect for canceling the displacement of the magnetic pole position PS can be obtained for each group Pg. Therefore, the arrangement order of the groups Pg1 to Pg12 can be arbitrarily exchanged in group units.

Figures 17A, 17B:
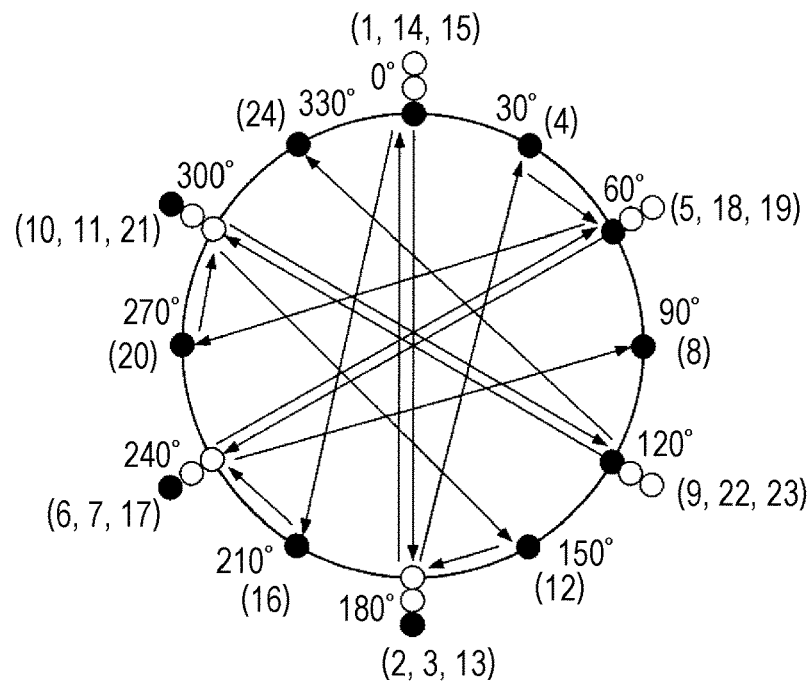
FIGS. 17A and 17B are diagrams of a third example of an improved search order.
Figure 18:
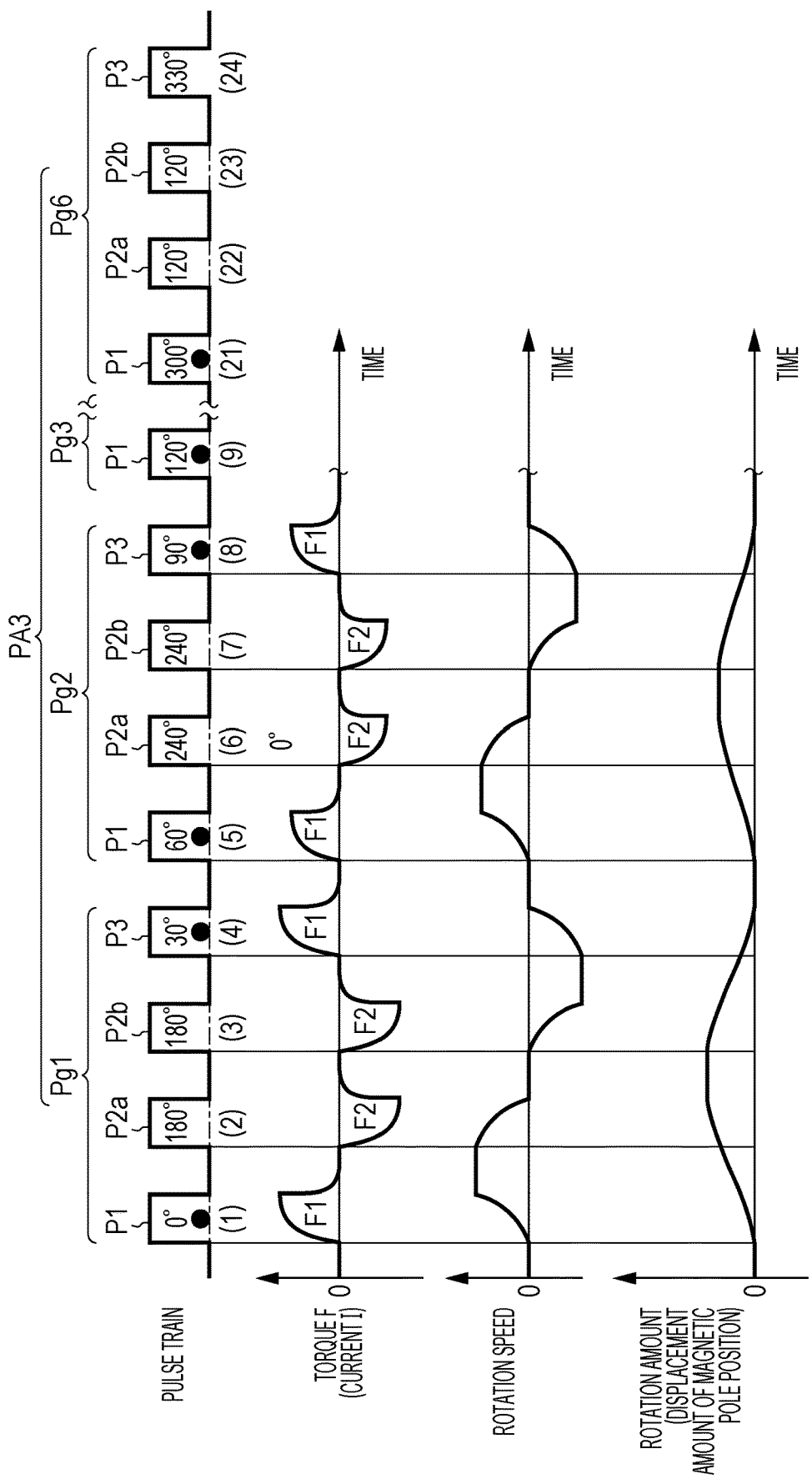
FIG. 18 is a diagram illustrating a configuration and an action of a pulse train according to the third example in FIGS. 17A and 17B.

FIGS. 17A and 17B illustrate a third example of the improved search order, and FIG. 18 illustrates a configuration and an action of a pulse train PA3 according to the third example in FIGS. 17A and 17B.

In the search performed in the order in the third example, the pulse train PA3 illustrated in FIG. 18 is applied. The number of pulses of the pulse train PA3 is 24 which is larger than 12 which is the number n of the search angles θ and is smaller than that in the second example. The pulse train PA3 includes a pulse to be applied to reduce the displacement amount of the magnetic pole position PS in addition to the 12 pulses necessary for measuring the current I.

The pulse train PA3 is a pulse train in which six groups Pg1, Pg2, Pg3, Pg4, Pg5, and Pg6 are connected, and the number of the groups in the pulse train PA3 is smaller than 12 which is the number n of the search angles θ. Each of the groups Pg1 to Pg6 includes four pulses P1, P2a, P2b, and P3.

The pulse P1 is the first pulse at the first angle θ1, and the pulses P2a and P2b are the second pulses at the second angle θ2 or the third angle θ3. The pulse P3 is the third pulse at the fourth angle θ4.

In the third example, in each of the groups Pg1 to Pg6, the values of the second angle θ2 and the third angle θ3 are the same, and the value of the first angle θ1 is different from the value of the fourth angle θ4. For example, the first angle θ1, the second angle θ2, the third angle θ3, and the fourth angle θ4 of the leading group Pg1 are respectively set to 0°, 180°, 180°, and 30°. In the final group Pg5, the angles are sequentially set to 300°, 150°, 150°, and 330° as in the leading group.

Then, as illustrated in FIG. 17B, in the groups Pg1 to Pg5 other than the final group Pg6, when the first pulse P1 is applied and when the fourth pulse P3 is applied, it is determined to measure the current I. That is, in each of the groups Pg1 to Pg5, the current I is measured twice. In the final group Pg6, it is determined to measure the current I only once when the first pulse P1 is applied.

According to the third example, a required time for the initial position estimation can be shortened than the second example by the pulses less than that in the second example.

Figures 19A, 19B:
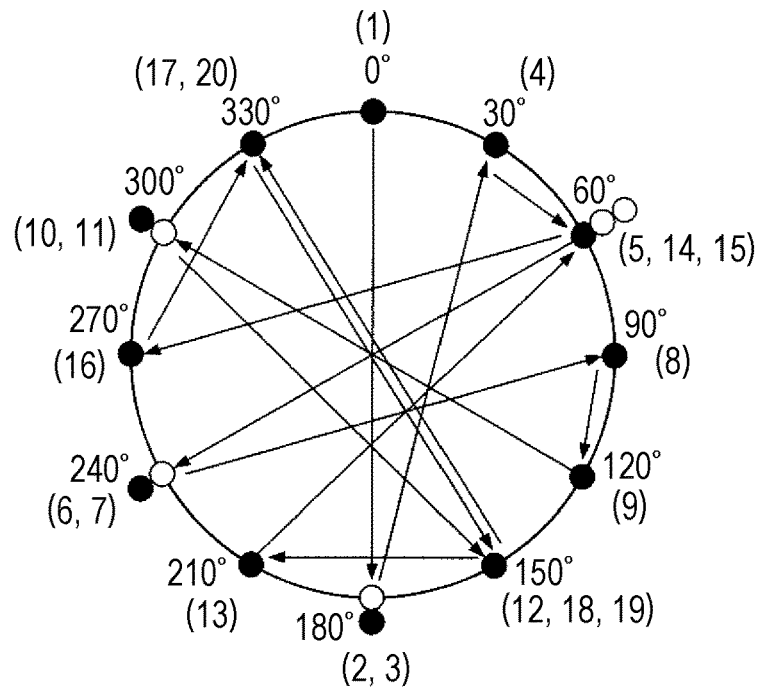
FIGS. 19A and 19B are diagrams of a fourth example of an improved search order.

FIGS. 19A and 19B illustrate a fourth example of the improved search order, and FIG. 20 illustrates a configuration and an action of a pulse train PA4 according to the fourth example in FIGS. 19A and 19B.

In the search performed in the order in the fourth example, the pulse train PA4 illustrated in FIG. 20 is applied. The number of pulses of the pulse train PA4 is 20 which is larger than 12 which is the number n of the search angles θ and is smaller than that in the third example. The pulse train PA4 includes a pulse to be applied to reduce the displacement amount of the magnetic pole position PS in addition to the 12 pulses necessary for measuring the current I.

The pulse train PA4 is a pulse train in which five groups Pg1, Pg2, Pg3, Pg4, and Pg5 are connected, and the number of the groups in the pulse train PA4 is smaller than 12 which is the number n of the search angles θ. Each of the groups Pg1 to Pg5 includes four pulses P1, P2a, P2b, and P3.

The pulse P1 is the first pulse at the first angle θ1, and the pulses P2a and P2b are the second pulses at the second angle θ2 or the third angle θ3. The pulse P3 is the third pulse at the fourth angle θ4.

In the fourth example, in each of the groups Pg1 to Pg5, the values of the second angle θ2 and the third angle θ3 are the same. This point is similar to the third example. In the groups Pg1 to Pg4, the value of the first angle θ1 is different from the value of the fourth angle θ4, and in the group Pg5, the values of the first angle θ1 and the fourth angle θ4 are the same.

Specifically, the first angle θ1, the second angle θ2, the third angle θ3, and the fourth angle θ4 in the groups including the leading group Pg1 to the third group Pg3 are the same as those in the third example (refer to FIGS. 17A and 17B). The first angle θ1, the second angle θ2, the third angle θ3, and the fourth angle θ4 of the fourth group Pg4 are sequentially set to 210°, 60°, 60°, and 270°. In the final group Pg5, similarly, the angles are sequentially set to 330°, 150°, 150°, and 330°.

As illustrated in FIG. 19B, in the groups Pg1 to Pg3, when the first pulse (P1) is applied, when one of the plurality of second pulses (P2b) is applied, and when the third pulse (P4) is applied, it is determined to measure the current I. Since it is considered that the magnetic pole position PS is closer to the original position when the pulse P2b, which is applied later, of the plurality of second pulses (P2a and P2b) is applied, it is preferable that the current I be measured when the pulse P2b is applied.

In the group Pg4, it is determined to measure the current I when the first pulse (P1) is applied and when the third pulse (P4) is applied. In the final group Pg5, it is determined to measure the current I when the first pulse (P1) is applied.

According to the fourth example, a required time for the initial position estimation can be further shortened than the third example by the pulses less than that in the third example.

Figure 21:
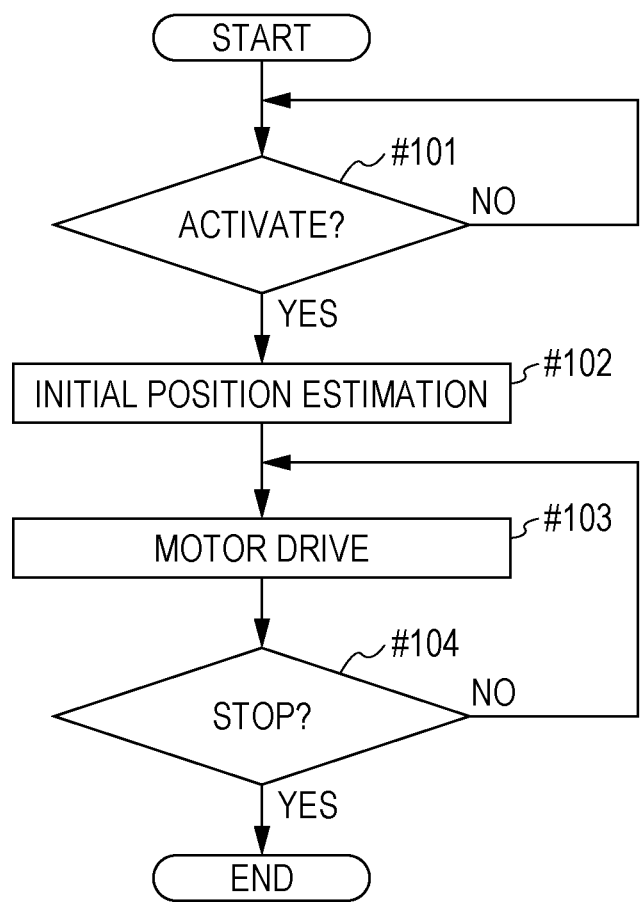
FIG. 21 is a diagram of an outline of a flow of processing in the motor control device.

FIG. 21 illustrates an outline of a flow of processing in the control device 21.

The control device 21 waits for an input of an activation instruction from the control circuit 100 (#101). When the activation instruction is input (YES in #101), the initial position estimation processing is performed (#102), and motor drive for rotating the motor 3 is controlled (#103). The control of the motor drive is continued until a stop instruction is input from the control circuit 100 (#104).

According to the above embodiment, at the time of the initial position estimation, the torque capable of reversely rotating the rotor 32 that initially rotates can be generated by applying the pulses twice with time shift, instead of applying the pulse once. As a result, even when the magnetic pole position PS is displaced in each group Pg of the pulse train PA, the magnetic pole position PS can be returned to the original position, and the accuracy of the initial position estimation can be enhanced by reducing the displacement amount of the magnetic pole position PS in the initial position estimation.

In the above described embodiment, in a case where the inertial rotation caused by the magnetic field vector stops within a relatively short time and the like, the application of the third pulse is omitted, and each group Pg of the pulse train PA may include the first pulse and the plurality of second pulses. In that case, the magnetic pole position PS displaced by the application of the first pulse can be moved closer to the original position by the application of the second pulses, and the displacement amount of the magnetic pole position PS during the initial position estimation can be reduced. Each of the entire pulse trains PA1 to PA4 including the pulse to reduce the displacement amount of the magnetic pole position PS is a pulse train for searching the initial position.

In the above described embodiment, the initial position estimator 25 may store the angle setting information 80 for specifying the search angle θ and designate the angle θ with respect to the speed controller 41.

In the embodiment described above, the number of the second pulses in each group Pg of the pulse train PA may be equal to or more than three. It is preferable that the specific values of the first angle θ1, the second angle θ2, the third angle θ3, and the fourth angle θ4 be determined so as to obtain the effect for reducing the displacement amount of the magnetic pole position PS in each group Pg, and the specific values are not limited to the exemplified values.

In addition, the configurations, the processing contents, the order or timing, the pulse period H in the pulse train PA, the pulse width, and the like of the entire or each unit of the image forming device 1 and the motor control device 21 can be appropriately changed according to the gist of the present invention.

Although embodiments of the present invention have been described and illustrated in detail, the disclosed embodiments are made for purposes of illustration and example only and not limitation. The scope of the present invention should be interpreted by terms of the appended claims.

What is claimed is:

1. A control device of a permanent magnet synchronous motor that is a control device of a sensorless-type permanent magnet synchronous motor in which a rotor using a permanent magnet rotates by a rotating magnetic field caused by a current flowing in an armature, the control device comprising:
   a driver that applies a voltage to the armature and drives the rotor;
   an initial position estimator that estimates an initial position which is a magnetic pole position of the rotor that is stopped; and
   a controller that controls the driver so as to apply a pulse train including a voltage pulse for searching the initial position for each of n angle positions dividing a search range of an electrical angle of 360 degrees to the armature, wherein
   the pulse train includes a first pulse at one of the n angle positions and a second pulse that is a pulse, that generates a torque larger than the torque generated by the first pulse, at an angle position where a torque is generated for rotating the rotor in a second direction opposite to a first direction that is a rotation direction of the rotor in a case where a torque for rotating the rotor is generated by application of the first pulse.

2. A control device of a permanent magnet synchronous motor that is a control device of a sensorless-type permanent magnet synchronous motor in which a rotor using a permanent magnet rotates by a rotating magnetic field caused by a current flowing in an armature, the control device comprising:
   a driver that applies a voltage to the armature and drives the rotor;
   an initial position estimator that estimates an initial position which is a magnetic pole position of the rotor that is stopped; and
   a controller that controls the driver so as to apply a pulse train including a voltage pulse for searching the initial position for each of n angle positions dividing a search range of an electrical angle of 360 degrees to the armature, wherein
   the pulse train includes a first pulse at one of the n angle positions and a plurality of second pulses that is a pulse at an angle position where a torque is generated for rotating the rotor in a second direction opposite to a first direction that is a rotation direction of the rotor in a case where a torque for rotating the rotor is generated by application of the first pulse.

3. The control device of the permanent magnet synchronous motor according to claim 2, wherein
   the pulse train is a pulse train in which a plurality of groups, including the first pulse, the plurality of second pulses, and a third pulse at an angle position where a torque for rotating the rotor in the first direction is generated, is connected.

4. The control device of the permanent magnet synchronous motor according to claim 3, wherein
   the number of pulses in the pulse train is the same as the number n of the angle positions.

5. The control device of the permanent magnet synchronous motor according to claim 4, wherein
   the number n of the angle positions is an integral multiple of four,
   any one of the pluses included in the pulse train generates a magnetic field vector at an angle position that does not correspond to other pulses;
   in each group of the pulse train,
   the plurality of second pulses includes two pluses including a pulse at a second position that is an angle position separated from a first position that is an angle position corresponding to the first pulse by equal to or more than ±90 degrees and a pulse at a third position that is an angle position closest to the second position, and
   the third pulse is at a fourth position that is an angle position separated from the third position by equal to or more than ±90 degrees.

6. The control device of the permanent magnet synchronous motor according to claim 3, wherein
   the number of the groups in the pulse train is the same as the number n of the angle positions,
   in each group of the pulse train,
   the first pulse generates a magnetic field vector at an angle position that does not correspond to a first pulse of other group,
   the plurality of second pulses includes two pulses that generate magnetic field vectors at the same angle position separated from the angle position corresponding to the first pulse by equal to or more than ±90 degrees, and
   the third pulse generates a magnetic field vector at an angle position corresponding to the first pulse.

7. The control device of the permanent magnet synchronous motor according to claim 6, wherein
   the initial position estimator estimates the initial position based on a current flowing in the armature when the first pulse of each group in the pulse train is applied.

8. The control device of the permanent magnet synchronous motor according to claim 3, wherein
   the number of the groups in the pulse train is less than the number n of the angle positions,
   in each group of the pulse train, the first pulse generates a magnetic field vector at an angle position that does not correspond to a first pulse of other group, the plurality of second pulses includes two pulses that generate magnetic field vectors at the same angle position separated from the angle position corresponding to the first pulse by equal to or more than ±90 degrees, and the third pulse generates a magnetic field vector at an angle position that is closest to the angle position corresponding to the first pulse and that does not correspond to a third pulse of the other group.

9. The control device of the permanent magnet synchronous motor according to claim 8, wherein the initial position estimator estimates the initial position based on a current flowing in the armature each time when the first pulse of each group in the pulse train is applied and when the third pulse of the plurality of groups is applied.

10. The control device of the permanent magnet synchronous motor according to claim 8, wherein the initial position estimator estimates the initial position based on a current flowing in the armature each time when the first pulse of each group in the pulse train is applied, when one of the two second pulses of the plurality of groups is applied, and when the third pulse of the plurality of groups is applied.

11. An image forming device including the control device of the permanent magnet synchronous motor according to claim 1, the image forming device comprising:

a printer engine that prints an image on a sheet at a printing position; and a roller that is rotated and driven by the sensorless-type permanent magnet synchronous motor controlled by the control device and conveys the sheet to the printing position.

12. The image forming device according to claim 11, wherein the permanent magnet synchronous motor is an inner-rotor brushless motor.

* * * * *